(12) United States Patent
Arhab

(10) Patent No.: US 7,484,604 B2
(45) Date of Patent: *Feb. 3, 2009

(54) HYDROKINETIC COUPLING APPARATUS, IN PARTICULAR FOR MOTOR VEHICLE

(75) Inventor: Rabah Arhab, Saint-Brice-Sous-Foret (FR)

(73) Assignee: Valeo Embrayages, Amiens (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/430,862

(22) Filed: May 10, 2006

(65) Prior Publication Data
US 2006/0201765 A1 Sep. 14, 2006

Related U.S. Application Data

(63) Continuation of application No. 09/806,035, filed as application No. PCT/FR00/02155 on Jul. 27, 2000, now abandoned.

(30) Foreign Application Priority Data
Jul. 27, 1999 (FR) .................................. 99 09739

(51) Int. Cl.
*F16H 45/02* (2006.01)
(52) U.S. Cl. ..................... 192/3.29; 192/70.18; 192/200
(58) Field of Classification Search ........................ None
See application file for complete search history.

(56) References Cited

U.S. PATENT DOCUMENTS

| 2,694,478 | A | | 11/1954 | Zeidler | |
|---|---|---|---|---|---|
| 2,793,726 | A | | 5/1957 | Jandasek | |
| 5,575,363 | A | * | 11/1996 | Dehrmann et al. | 192/3.3 |
| 5,826,690 | A | * | 10/1998 | Maingaud et al. | 192/70.18 |
| 6,688,441 | B1 | * | 2/2004 | Arhab et al. | 192/3.29 |
| 6,926,131 | B1 | * | 8/2005 | Arhab et al. | 192/3.29 |

FOREIGN PATENT DOCUMENTS

| DE | 29 42 043 A | | 5/1981 |
|---|---|---|---|
| FR | 2 748 539 A | | 11/1997 |
| GB | 2079875 A | | 1/1982 |
| WO | WO 98/58194 | | 12/1998 |
| WO | WO 99/01682 A1 | * | 1/1999 |
| WO | WO 00/40878 | | 7/2000 |

* cited by examiner

*Primary Examiner*—Rodney H Bonck
(74) *Attorney, Agent, or Firm*—Berenato, White & Stavish, LLC

(57) ABSTRACT

A Hydrokinetic Coupling Apparatus including a casing (30) provided with a transverse wall and enclosing a turbine wheel. A piston is located between the turbine wheel and the wall and the piston is connected by axially elastic tongues to the external periphery of the casing.

23 Claims, 26 Drawing Sheets

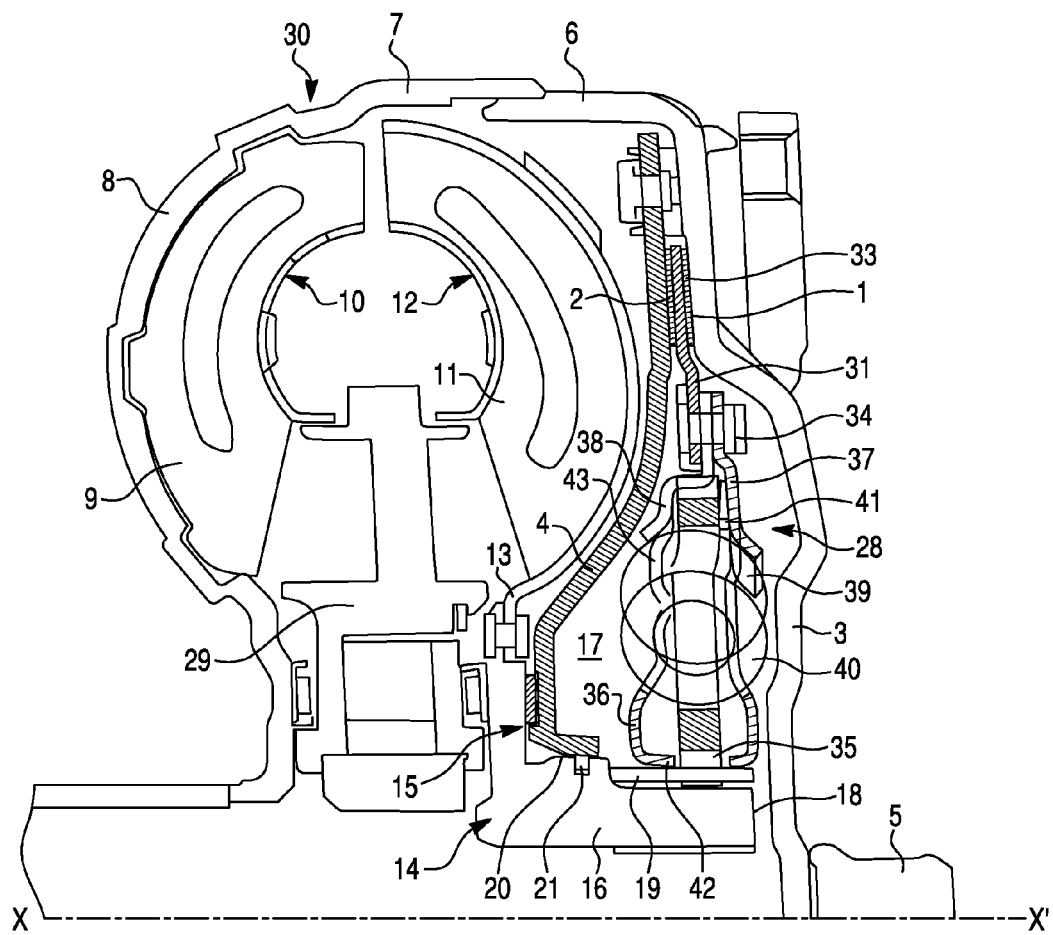

HYDROKINETIC COUPLING APPARATUS, IN PARTICULAR FOR MOTOR VEHICLE

This application is a Continuation Application of U.S. patent application Ser. No. 09/806,035 filed Mar. 26, 2001, now abandoned which is a U.S. National Phase Application of PCT/FR00/02155 filed Jul. 27, 2000, which claims the benefit of French Patent Application No. 99/09739 filed Jul. 27, 1999, all of which are herein incorporated by reference.

FIELD OF THE INVENTION

The present invention concerns particularly a hydrokinetic coupling apparatus for motor vehicles.

DESCRIPTION OF RELATED ART

Such a hydrokinetic coupling apparatus is described in the document FR 96-05722 published under the number FR-A 2748539. In this document the apparatus includes an input element in the form of a casing provided with a wall with a roughly transverse orientation and an output element comprising a turbine wheel/hub assembly housed inside the casing. A piston is located between the said assembly and the transverse wall. The piston is mounted so as to move axially with respect to the transverse wall and is fixed to the latter with respect to rotation.

The input element is intended to be fixed with respect to rotation, by means of its transverse wall, to a driving shaft, whilst the output element is intended to be fixed with respect to rotation, by means of its hub, to a driven shaft.

The piston has at its external periphery a surface referred to as the second surface, whilst the transverse wall has opposite the second surface a surface referred to as the first surface. the surfaces are here friction surfaces, a friction disc being interposed between the two surfaces. By causing the pressure to vary on each side of the piston, the latter is moved axially in one direction or the other. The piston is therefore able to move axially with respect to the hub. In this document the friction disc is provided at its external periphery with lugs extending above the piston in order to mesh with an input part of a torsion damper, comprising an output part provided with a damper plate connected to the hub.

Circumferentially acting elastic members act between the input and output parts shaped so as to receive the elastic members, which extend radially above the piston and surfaces.

It may be desirable to increase the outside diameter of the surfaces, which is not possible because of the presence of the elastic members.

SUMMARY OF THE INVENTION

The object of the present invention is therefore to increase the outside diameter of the surfaces, and this in an economical manner. According to the invention a coupling apparatus of the type indicated above is characterised in that the piston is connected by axially elastic tongues to the external periphery of the casing.

By virtue of the invention, it is possible to increase the outside diameter of the surfaces whilst having good filtration of the vibrations by means of the torsion damper.

In addition the tongues fix the piston to the casing with respect to rotation whilst allowing an axial movement of the piston, and this more easily than a connection, for example, of the mortice and tenon type. In addition the axial bulk is reduced at the external periphery of the casing since the tongues are less bulky than the torsion damper of the prior art.

Because of the tongues the piston can surround, with radial clearance, an axially oriented annular part of the hub with the intervention of a seal between the piston and this axially oriented part. Thus the risk of jamming of the piston during its axial movement is limited.

According to another characteristic, a torsion damper is interposed between the piston and the transverse wall in order to filter vibrations, the said torsion damper acting disengageably between the hub and piston. Thus good filtration of the vibration is obtained.

It is known from the aforementioned document that a friction means can be interposed between the piston and the hub, in order to prevent any direct contact between the piston and hub.

By virtue of the invention the damper plate of the prior art is eliminated and the piston is adjacent to the turbine wheel and to the hub. The friction means is interposed between a transverse surface of the hub and the piston. In one embodiment, the piston is shaped so as to carry the friction means, and the hub has an axially oriented annular portion directed towards the transverse wall and surrounded by the piston mounted so as to move axially with respect to the said portion.

In another embodiment, the friction means is carried by at least one rivet serving to fix the turbine wheel to the hub. In both cases the hub does not undergo any additional machining operation.

All this is made possible by virtue of the axially elastic tongues allowing a movement of the piston permitting good contact between the friction means and the associated surface, in particular when a radial clearance exists between the piston and the friction means.

In one embodiment, the apparatus includes a lock-up clutch of the two-face type, with a torsion damper provided with an input part fixed to a friction disc interposed between the two surfaces. The solution is simple and economical since the torsion damper has the configuration of a friction member or clutch disc of the standard type. Thus the input part consists for example of two guide washers disposed on each side of a damper plate constituting the output part of the torsion damper. This damper plate, in one embodiment, meshes, possibly after a circumferential clearance has been taken up, with a set of teeth, such as flutes, produced in an axially oriented part of the hub.

In one embodiment, the tongues extend radially above the second surface. For this purpose the tongues are fixed at one end to an intermediate piece fixed to the casing and extend radially above the piston. At their other end the tongues are fixed to radial projections on the piston, for example in the form of lugs.

In another embodiment for increasing the diameters of the surfaces the tongues extend opposite the second surface. In one embodiment the tongues act between a first piece fixed to the piston and a second piece fixed to the external periphery of the casing. Naturally the tongues can act directly between the casing and the piston.

These tongues are fixed for example at one of their ends to projecting lugs on the piston and at their other end to the transverse wall. These tongues can be provided with corrugations with different heights to produce an axial offset.

BRIEF DESCRIPTION OF THE DRAWINGS

The description which follows illustrates the invention with regard to the accompanying drawings, in which:

FIGS. 6, 8, 11, 14, 16, 18, 20, 22, 25, 27, 29, 31, 33, 35, 38, 41, 43, 45, 48, 50, 53 and 56 are views similar to FIG. 1 for other example embodiments according to the invention, FIGS. 9, 12, 15, 17, 19, 21, 23, 26, 28, 30, 32, 34, 36, 39, 42, 44, 46, 49, 51, 54 and 57 are views similar to FIG. 4 for the respective different example embodiments of FIGS. 8, 11, 14, 16, 18, 20, 22, 25, 27, 29, 31, 33, 35, 38, 41, 43, 45, 48, 50, 53 and 56, FIG. 37 is a partial view in the direction of the arrow 37 in FIG. 36 without the hub.

DETAILED DESCRIPTION OF PREFERRED EMBODIMENTS

In the figures the common elements will for reasons of simplicity be allocated the same reference signs.

Figure 1:
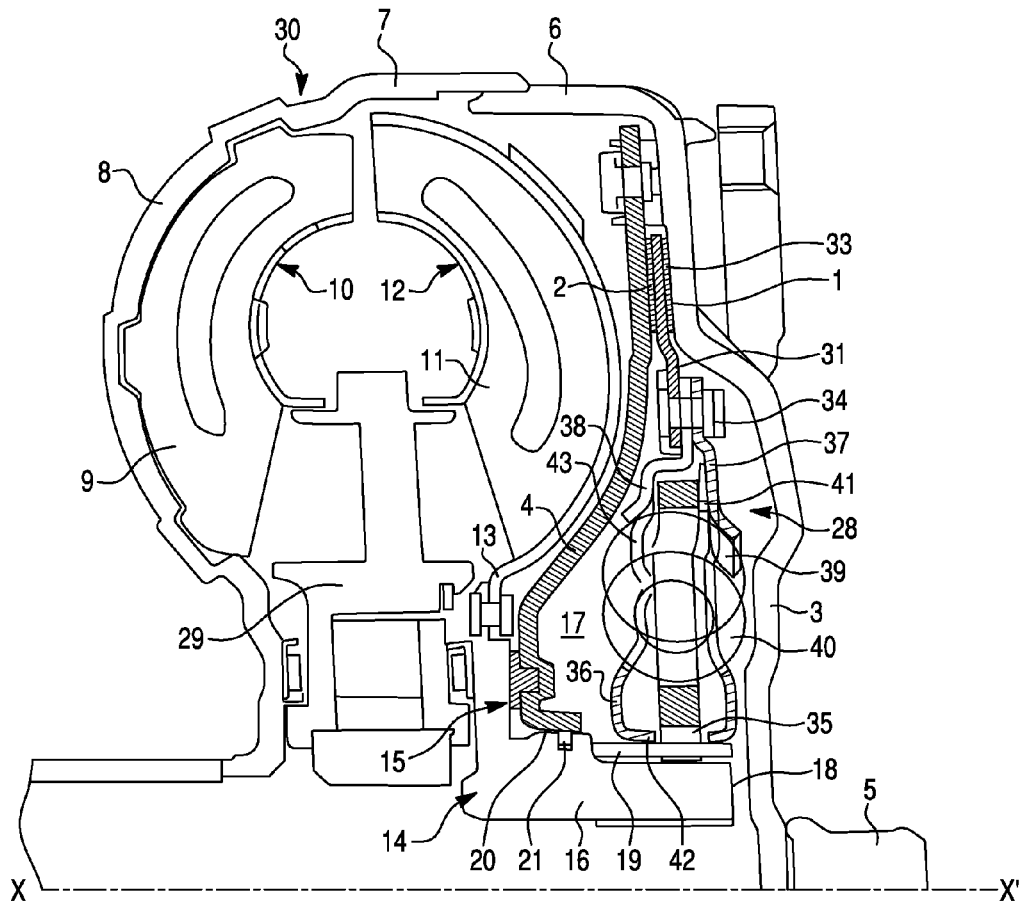
FIG. 1 is a half-view in axial section of a hydrokinetic coupling apparatus according to the invention.
Figure 2:
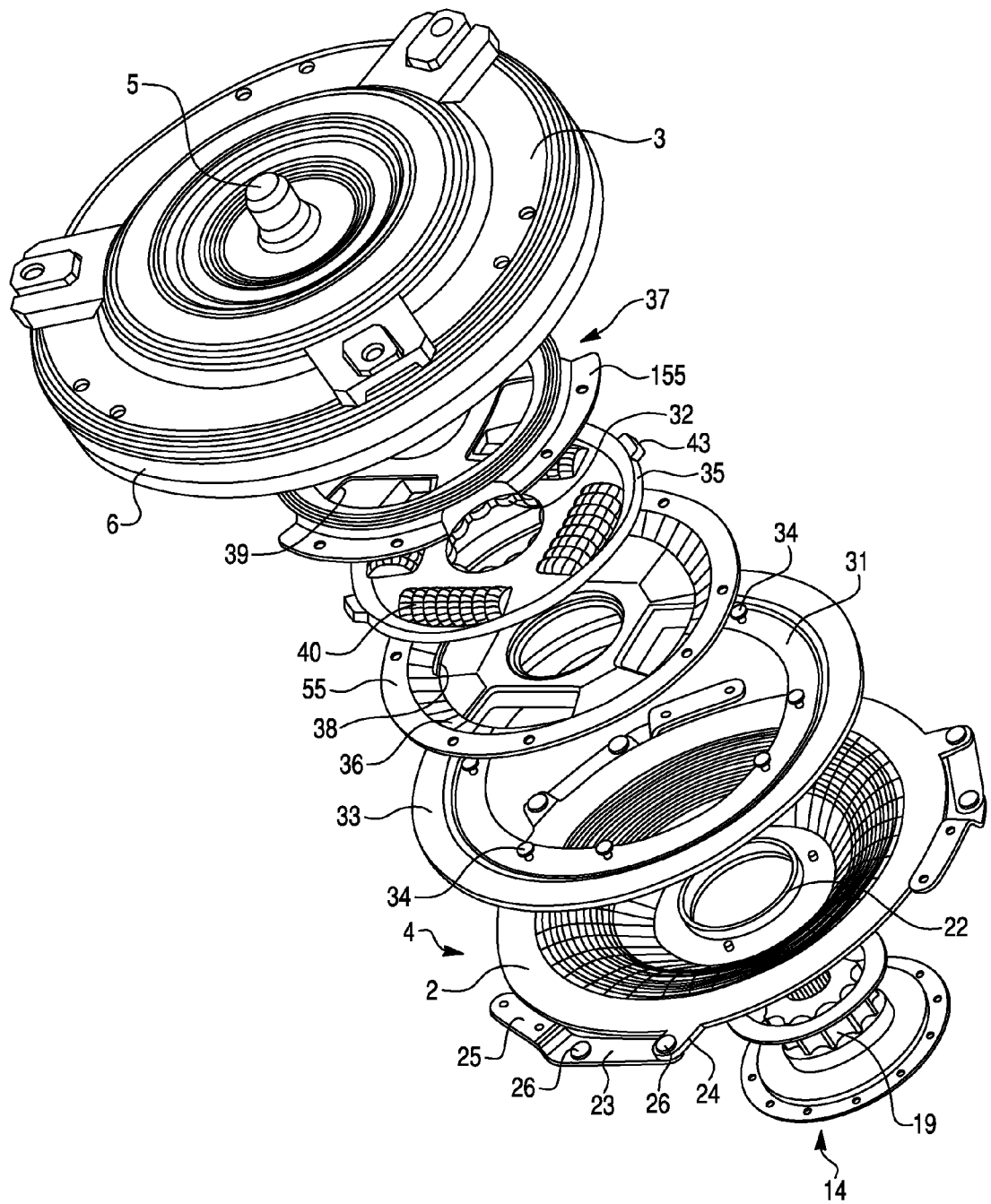
FIGS. 2 and 3 are exploded views of the hub, lock-up clutch, casing element and torsion damper intended to equip the hydrokinetic coupling apparatus.
Figure 3:
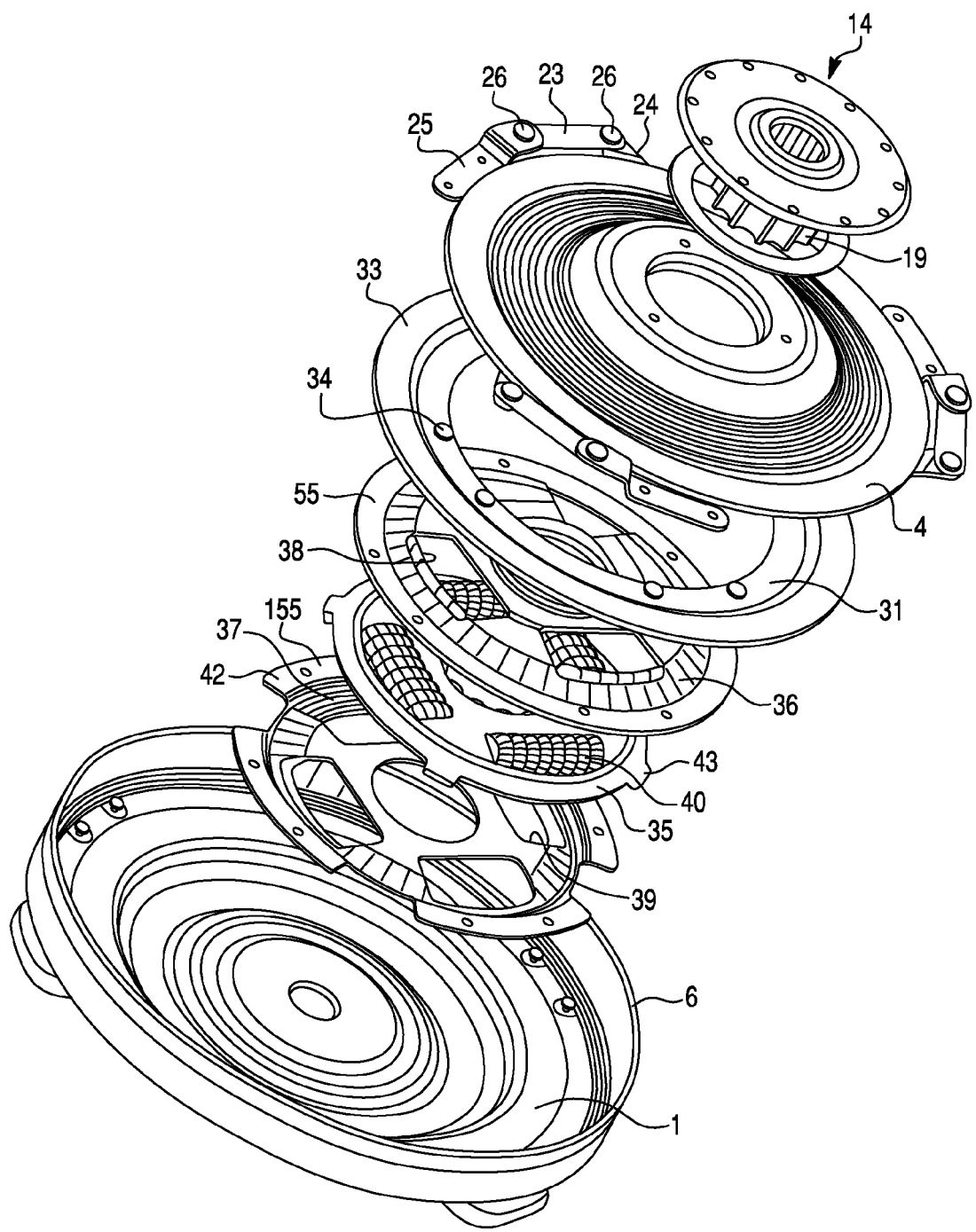

Thus in FIGS. 1 to 3, a first surface and second surface can be seen respectively at 1 and 2. These surfaces 1 and 2 are transversely oriented and are formed at the external periphery respectively of a roughly transversely oriented wall 3 and of a piston 4.

The surfaces 1, 2 are here in a single piece with the wall 3 and piston 4. As a variant at least one of the surfaces 1, 2 can belong to an additional piece attached for example by welding to the element concerned consisting of wall 3 and piston 4.

The piston 4 is mounted with the possibility of axial movement with respect to the wall 3 provided centrally with a centering nose 5 projecting axially and roughly tubular in shape.

The wall 3 is extended at its external periphery by a first axially oriented annular flange to form a first casing element 3, 6. A second axially oriented annular flange 7 comes to be centred, at its free end, on the free end of the first flange 6. This second flange 7 is therefore in close contact through its internal periphery with the external periphery of the first flange 6 and is fixed here by welding to the first flange 6. The second flange 7 is extended by a semi-toric enclosure 8 to which the blades 9 of an impeller wheel 10, facing the blades 11 of a turbine wheel 12, are fixed internally. The flange 7 and enclosure 8 belong to a second casing element 7, 8. The piston 4 extends between the turbine wheel 12 and the wall 3.

This turbine wheel 12 has internally an annulus 13, possibly divided, by means of which it is fixed, here by rivets 59, or as a variant by welding, to the external periphery of a hub 14 directly axially towards the wall 3 and roughly in the shape of an L. It is therefore to the transversely oriented part 15, in the form of a shield, of the hub 14, that the annulus 13 is fixed, whilst the axially oriented part 16 of the hub 14 is fluted internally for rotational connection of hub 14, and therefore of the turbine wheel 12, with a driven shaft, not shown. This driven shaft is, in a known fashion, provided centrally with a channel for supplying a hydraulic control chamber 17 delimited axially by the piston 4 and wall 3 and radially, internally, by the axial part 16 of the hub 14.

For this purpose at least one passage 18 exists between the free end of the axial part 16 and the wall 3 for passage of the control fluid, here oil, coming from the channel of the driven shaft. The part 16 is roughly tubular in shape and has externally, at its free end, external flutes 19. The axial part 16 has externally, between the shield 15 and the flutes 19, a smooth surface 20 with a diameter slightly greater than that of the flutes 19, so that the axial part 16 is stepped in diameter. A seal 21 is mounted in a groove (not referenced) produced in the surface 20.

This seal 21 cooperates with an axially oriented ferrule 22 which the piston 4 has at its internal periphery.

A seal is therefore produced at this point, according to one characteristic the surface 20 is not a guide surface so that this surface does not require to be machined, which reduces the cost of the hub 14.

In fact, a radial clearance exists between the surface 20 and the ferrule 22. According to the invention, the piston 4 is connected by axially elastic tongues 23 to the external periphery of the casing 30 and a torsion damper 28 is interposed between the piston 4 and the transverse wall 3 in order to filter the vibrations, the said damper 28 acting disengageably between the piston 4 and the hub 14. The tongues 23 fix the piston 4 to one of the casing elements with respect to rotation, and this with axial mobility and a risk of jamming which is limited by the radial clearance between the surface 20 and the ferrule 22.

In one embodiment the piston 4 is fixed with respect to rotation, with the possibility of axial movement, to one of the flanges 6, 7 by a connection with axially elastic tongues 23. These tongues 23 are therefore connected to one of the flanges 6, 7.

The number of tongues 23 depends on the application, these being regularly distributed circumferentially in several sets of tongues 23, each set including here at least one tongue. In the example embodiment three sets of tongues 23 are provided.

The tongues 23 can be of transverse orientation, whilst being for example triangular or rectangular or tangential in shape. The tongues 23 act, in FIGS. 1 to 7, between a first piece 24 fixed to the piston 4 and a second piece 25 fixed to one of the flanges 6, 7.

Figure 6:
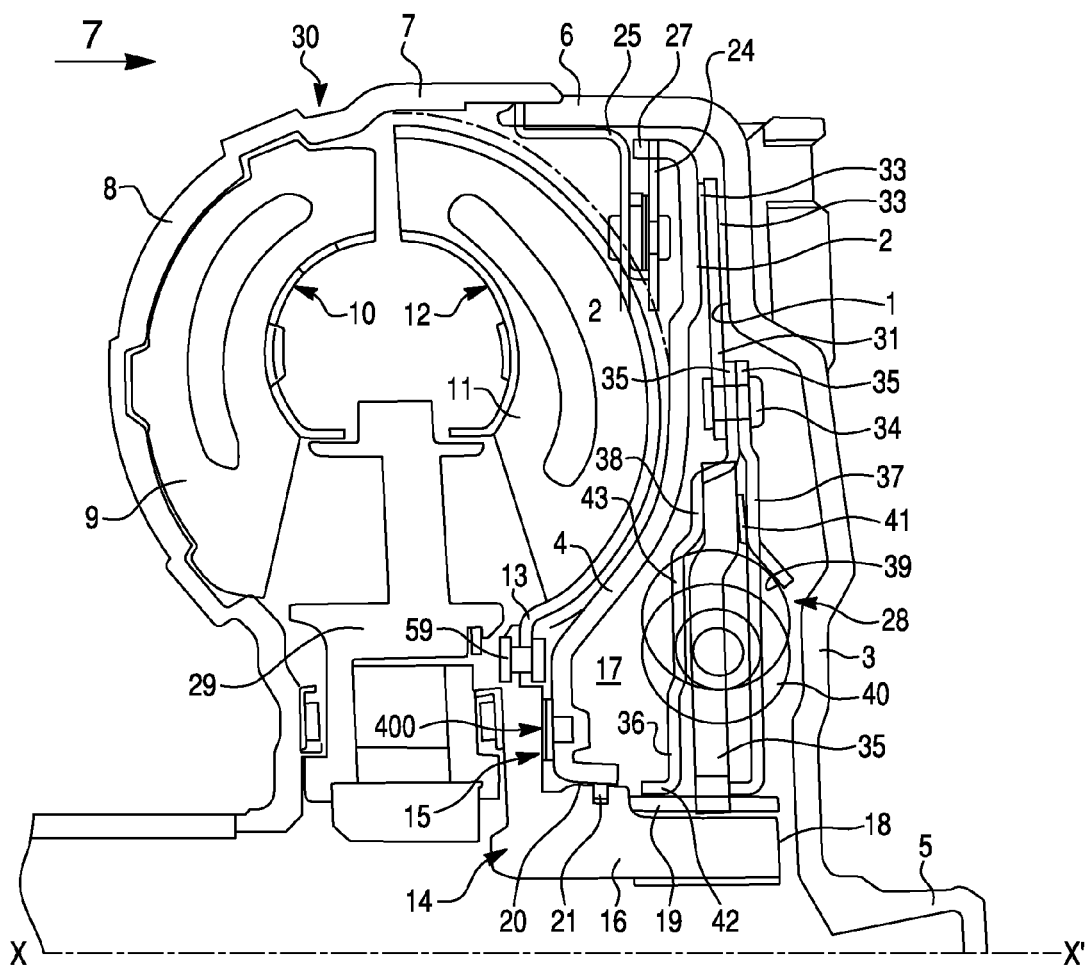
Figure 7:
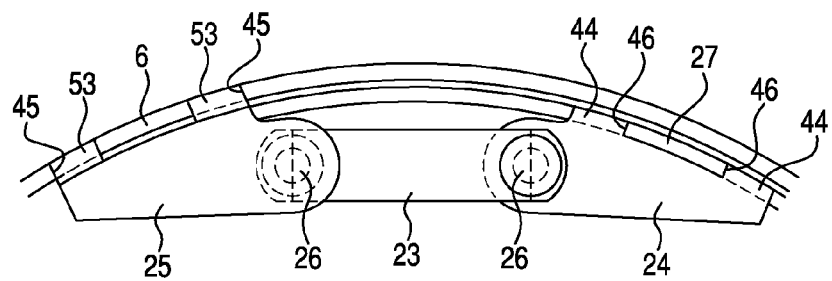
FIG. 7 is a partial view in the direction of the arrow 7 in FIG. 6 without the torque converter.

In the example embodiment in FIG. 1, the tongues 23 are fixed at each of their ends by rivets 26 respectively to the first piece 24 and the second piece 25. In this embodiment the first piece 24 is in a single piece with the piston 4 and consists of a plurality of lugs projecting radially outwards from the external periphery of the piston 4. In FIGS. 6 and 7 the piece 24 is distinct from the piston 4. For this purpose the piston 4 has at its external periphery a first axially oriented annular skirt 27 extending axially in the opposite direction with respect to the ferrule 22 and the wall 3, that is to say in the direction of the turbine wheel 12.

The skirt 27 stiffens the piston 4. In all cases the piston 4, radially below its surface 2, matches the shape of the turbine wheel 12 and hub 14 in order to reduce the bulk of the hydrokinetic coupling apparatus comprising the turbine wheels 12, the impeller 10, the piston 4, the hub 14 and a torsion damper 28 described below. The apparatus has an axis of axial symmetry and of rotation X-X'. Here the apparatus also has a reaction wheel 29 to form a torque converter in a known fashion.

The casing elements 7, 8 and 3, 6 form a sealed casing 30 filled with oil, inside which there are situated the pieces 29, 10, 12, 4, 14 and the damper 28, here of a standard type. More precisely the damper 28 has an input element 31 in the form of a disc intended to be clamped between the surfaces 1, 2. This element 31 is elastically connected to a central damper plate 35 fluted internally for mounting on the external flutes 19 on the hub 14. The damper plate 35 meshes here without circumferential clearance with the hub 14; the flutes 19 on the hub 14 and the internal flutes 32 on the damper plate 35 having complementary shapes.

As will have been understood, and in a known manner, by varying the pressure on each side of the piston 4—for example by varying the pressure in the hydraulic control chamber 17, by virtue of the driven shaft supply channel and the passage 18—the piston 4 is moved towards the wall 3 or in the opposite direction to the wall 3 in order in one case to grip the disc 31 between the surfaces 1, 2 or to release the disc 31.

When the disc 31 is clamped, it is said that the lock-up clutch, having the surfaces 1, 2 and the torsion damper 28, is engaged or locked so that the rotational driving movement is transmitted directly from the driving shaft—the crankshaft of a motor car in the case of an application to motor cars—to the driven shaft by the lock-up clutch without relative slip between the turbine wheel 12 and impeller wheel 10, which reduces the vehicle fuel consumption.

When the disc 31 is released, it is said that the lock-up clutch is disengaged or unlocked, so that the rotational driving movement is transmitted from the driving shaft to the driven shaft through the torque converter by virtue of the circulation of oil between the blades 9, 11 of the impeller wheel 10 and turbine wheel 12. This is what occurs when the motor vehicle starts up.

The tongues 23 allow an axial movement of the piston 4 with respect to the wall 3 when the lock-up clutch 1, 2, 28 moves from one position to the other. The damper 28 filters the vibrations, in the manner described below, and therefore acts disengageably between the piston 4 and hub 14, that is to say when the disc 31 is clamped.

Here the disc 31 fixedly carries friction linings 33 on each of its faces. As a variant the linings 33 are fixed to the surfaces 1, 2, which are then fixing surfaces. In a variant the disc 31 is, at its external periphery, embedded in a friction lining. As a variant the disc 31 rubs directly against the surfaces.

Preferably the lining or linings 33 are provided with grooves extending from the internal periphery to the external periphery for good cooling, the grooves being in contact with the surfaces 1, 2 or with the disc 31.

In FIGS. 1 to 5, the tongues 23 extend radially above the linings 33 and the surface 2. In FIGS. 6 and 7, the tongues 23 extend opposite the surface 2 and the linings 33 to increase the external diameter thereof.

Here the disc 31 is fixed at its internal periphery by rivets 34 to external peripheral annuli 55, 155 belonging to guide washers 36, 37 disposed on each side of the damper plate 35.

The annuli 55, 155 are in contact with each other. The damper plate 35 and the guide washers 36, 37 are provided, facing each other, with apertures 38, 39 for mounting elastic members 40 consisting here of coil springs or helical springs of the concentric type. An axially acting spring 41 bears on the guide washer 37, the closest to the wall 3, to act on the damper plate 33 and to clamp the latter in contact with the other guide washer 36, the closest to the piston 4.

For this purpose the washer 36 has a sinuous shape and has a surface radially above the springs 40. The damper plate 35 has at its external periphery radial lugs 43 each entering, with circumferential clearance, a scallop 42 produced in FIGS. 2 to 3 at the external periphery of the guide washer 37, which thus has a discontinuous annulus 155. The lugs 43, by cooperation with the relevant lateral edges of the scallops 42, limit the relative angular movement between the damper plate 35 and the guide washers 36, 37.

In FIGS. 1 and 6, the structures have been reversed, the scallops being produced in the guide washer 36.

During a relative movement between the damper plate 35 and the guide washers 36, 37—with the disc 31 clamped—the springs 40 are compressed and the damper plate 35 rubs on the washer 41, here a Belleville washer or in a variant a corrugated washer.

The damper 28 therefore advantageously has the form of a normal clutch friction device whose guide washers 36, 37 have, here at their internal periphery, a collar directed axially towards the flange 15 in FIG. 6 and directed towards each other in FIG. 1. In FIGS. 2 and 3, only the guide washer 36 has a collar, so that all combinations are possible. Each collar is substantially in contact with the external periphery of the flutes 39 and has a function of stiffening the assembly.

The second connecting piece 25 of the tongues 23 has, in FIGS. 1 to 3, the form of a stepped tongue with a bracket for fixing one end of the tongue 23 by means of rivets 26. This bracket is connected by a rounded part to a band provided with at least two holes for fixing the piece 25 by riveting to the external periphery of the wall 3. On the external face of this wall 3, threaded blocks (not referenced) are fixed, here by welding.

In a known manner a flange 15 is screwed onto these blocks in order to rotatably connect the first casing element 3, 6 to the driving shaft. The connecting pieces 25 extend tangentially with respect to the external periphery of the piston and are fixed by riveting to the external periphery of the wall 3, so that the friction linings 33 have a large external diameter, which is favourable to the transmission of the torque. Naturally it is possible to increase the external diameter of the linings 33 still further in order to transmit even more torque, as can be seen in FIG. 6.

Thus in FIGS. 6 and 7 the second connecting piece 25 of the tongues 23 has the shape of an angle bracket and therefore has a transversely oriented part to which the tongues 23 are fixed and an axially oriented part forming a skirt having at its external periphery transverse lugs 53. The tongues 23 are interposed between the piston 4 and turbine wheel 12.

The lugs 53 are each engaged in a complementary manner in a notch 45 provided here in the free end of the flange 6. The notches 45 and lugs 53 are covered by the flange 7. Likewise the first piece 24, here flat in shape, has at its external periphery lugs 44 each engaged in a complementary manner in a scallop or notch 46 provided in the free end of the skirt 27. Two lugs 53, 44 are provided per piece respectively 25, 24. Naturally this number depends on the application. By crushing the lateral edges of the notches 45, 46 cold or hot, for example by electric heating, the metal respectively of the flange 6 and skirt 27 is caused to flow, which makes it possible to axially immobilise the lugs 43, 44 between the bottom of the notches 45, 46 and enables material to flow back during the flow of the lateral edges of the notches 45, 46. Thus the pieces 25, 24 are fixed by crimping here to the flange 6 and piston 4.

In a variant the flange 6 can partially surround the flange 7 so that the notches 45 can be produced in the flange 7. In a variant the lugs 53, 44 are fixed by welding or adhesive bonding to one of the flanges 6, 7 and to the piston 4.

In a variant, the skirt of the piece 25 is fixed by welding, for example by transparency welding of the laser type, to the flange 6.

The first piece 24 can be welded directly to the piston 4, this piece then having a first portion for fixing the relevant end of a set of tongues and a second axially offset portion for fixing the first piece 24 by welding.

The piston 4 can also have, at its external periphery, a transverse return, possibly divided into lugs, directed towards the axis X-X' and making it possible to fix the first piece 25, for example by means of pop rivets. This return is connected by means of a 180° elbow to the external periphery of the piston. Naturally, in FIGS. 1 to 3, as a variant, the tongues 23 can be fixed directly to the wall 3, whilst being for example in a single piece with the pieces 25.

In FIGS. 1 to 6, a friction means 60 acts between a transverse surface formed by means of the flange 15 on the hub 14 and the piston 4 disengageably connected to the transverse wall by virtue of the second surface 2 extending opposite the first surface 1 in the aforementioned manner.

The friction means 60 prevents any direct contact between the piston 4 and transverse surface of the hub 14, this means limits the axial movement of the piston 4, thus preventing the latter from coming into contact with the turbine wheel 12. This friction means 60 has at least one friction element, preferably with a low coefficient of friction. This friction element is preferably made from synthetic materials such as plastics material, advantageously reinforced with fibres and/or balls such as glass fibres and/or balls.

In FIGS. 1 to 7, the piston 4 is adjacent to the assembly consisting of turbine wheel 12 and hub 14 and is shaped so as to carry the friction means 60, and the hub 14 has an axially oriented annular portion directed towards the transverse wall 3 and surrounded by the piston 4 mounted so as to be able to move axially with respect to the said portion.

By virtue of this arrangement, the flange 15 on the hub 14 does not need to undergo any additional machining operations since the friction means 60 is carried by the piston 4. The result is also that the mechanical strength of this flange 15 is preserved, and in addition the solution is simple and economical since the piston 4, advantageously metallic, is a part which can easily be shaped.

All this combines well with the damper 28 since the piston 4 is located axially between this damper and the assembly consisting of turbine wheel 12 and hub 14, whilst coming as close as possible to the said assembly and in particular the flange 15. In addition the piston 4 is rotatably connected to the external periphery of one of the two casing elements 30, which makes it possible to create a radial clearance between the ferrule 22 and surface 20, so that the risks of jamming of the piston 4 are minimised.

This piston 4 cooperates by means of its ferrule 22 solely with the joint 21 fixed to the hub 14, so that the friction means 60 have a good contact surface with the flange 15, since, by virtue of the tongues 23 and the joint 21, the piston 4 has a possibility of movement, particularly angular, so that the contact surface between the friction means 60 and the flange 13 are always at a maximum. In addition more torque is transmitted because of the location of the tongues 23 and the external periphery of the casing 30, so that the linings 33 can have a large outside diameter. The outside diameter of the surfaces 1, 2 is therefore increased.

Here one of the friction means 60—piston 4 elements has at least one projection engaged in a complementary manner in a hole in the other one of the piston—friction means elements.

This mode of connection by cooperation of shapes is simple and economical to effect and makes it possible to correctly centre the friction means 60, whilst providing a rotational connection.

Advantageously the hole is blind, so that the fluidtightness of the chamber 17 is preserved. The blind hole is advantageously produced by pressing or extrusion, and thus in FIGS. 1 to 6 the friction means 60 consists of a washer intended to come into contact with a transverse surface on the hub 14 formed by means of the flange 15, radially below the fixing rivets 59. This surface is turned towards the wall 3. The washer 60 has a plurality of studs 61 each engaged, here with axial and radial clearance, in a blind hole 62 produced locally by extrusion of the metal of the piston in the direction of the wall 3.

The studs 61 and holes 62 are cylindrical in shape, here with a circular cross-section, or as a variant with a square cross-section or any other shape. The contact surface between the flange 15 and washer 60 is at a maximum because of the mounting of the studs 61 with axial and radial clearance in the holes 62.

Figure 8:
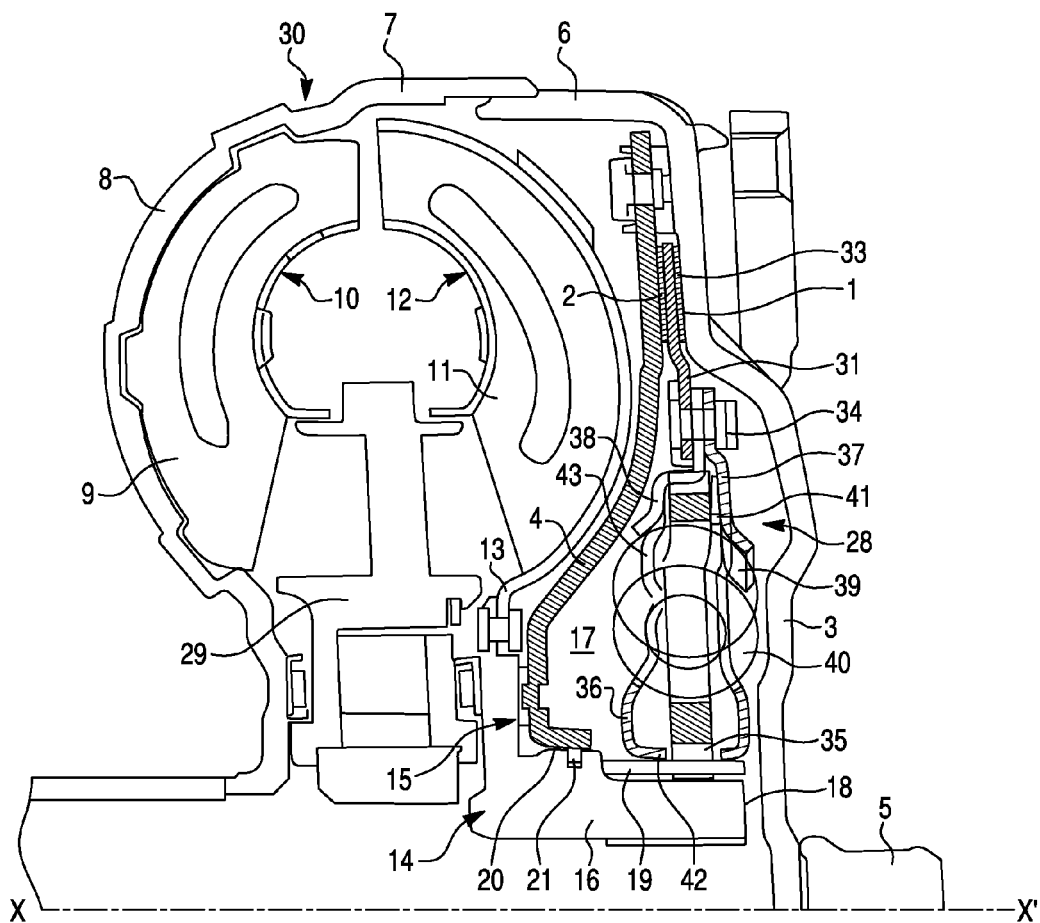
Figure 10:
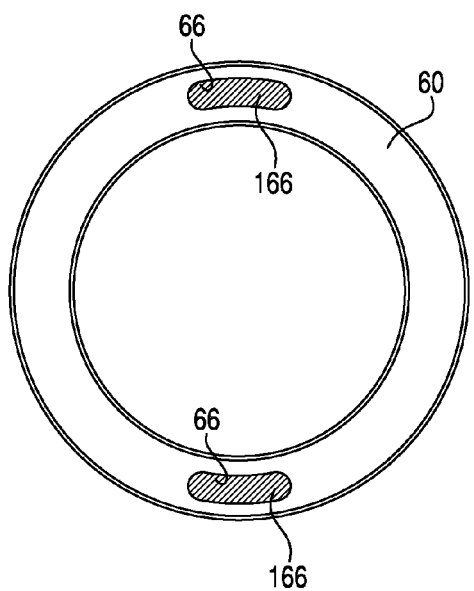
FIG. 10 is a view in section along the line 10-10 in FIG. 9.
Figure 9:
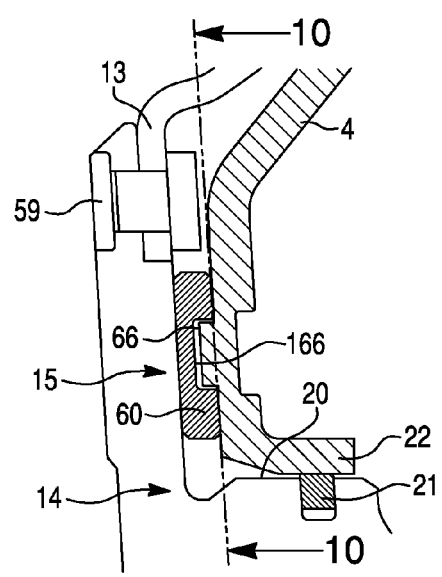

The structures can be reversed, see FIGS. 8 to 10, so that the blind hole 66 is produced in the friction washer 60, whilst the stud 166 is produced in the piston 4 by extrusion and flow of material in the direction of the flange 15. As a variant the stud 166 can be open and have, for example, the shape of a chimney. Preferably in this case the friction washer 60 is force-fitted on the stud 166 in order to preserve the seal on the piston 4.

Figure 4:
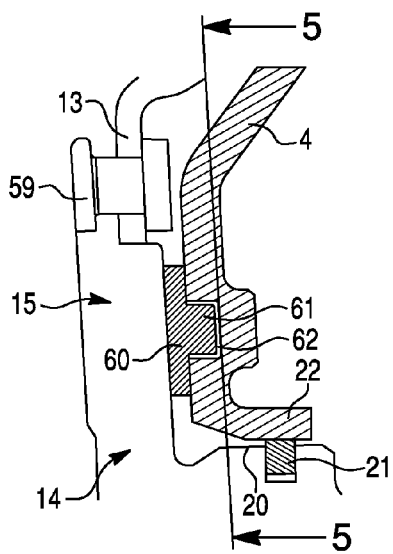
FIG. 4 is a view to a larger scale of the lower part of FIG. 1 showing the friction means according to the invention.
Figure 5:
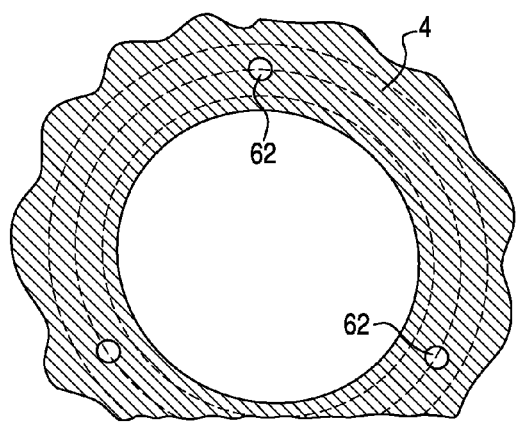
FIG. 5 is a partial view in section along the line 5-5 in FIG. 4 without the hub and without the friction means.

The number of holes depends on the applications, and thus in FIGS. 1, 4 and 5 three holes 62 and three studs 61 are provided, regularly distributed over the circumference of the friction washer 60, whilst in FIGS. 8 to 10 two studs 166 and two diametrically opposed holes 66 are provided. In this case the holes 66 and studs 166 have an oblong shape.

Naturally the shape and number of the holes and respectively of the studs can be combined, and preferably these are at least two in number.

In a variant the studs can enter the holes with radial mounting clearance or without clearance, that is to say with force, having regard to the fact that the piston can have a swivelling movement or angular movement as mentioned above.

As a result the friction means 60 can consist of a washer divided into a plurality of annular sectors coupled to the piston 4, preferably by at least two studs and two holes.

In FIGS. 1 to 10, the friction means 60 has a maximum contact surface with the transverse surface of the hub 14 and piston 4, the said piston 4 being perfectly fluidtight.

Figure 11:
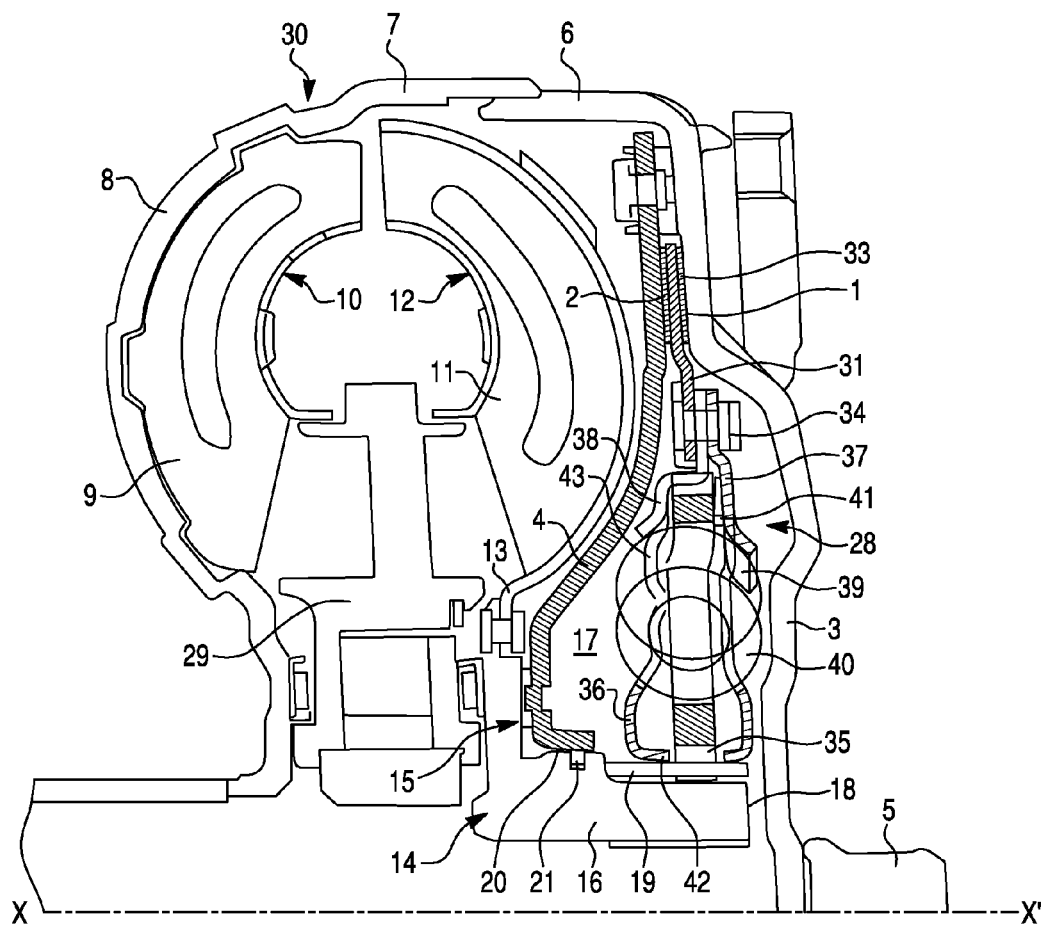
Figure 13:
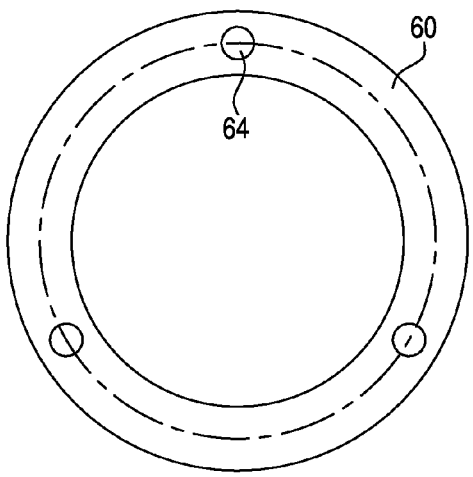
FIG. 13 is a view in section along the line 13-13 in FIG. 12.
Figure 12:
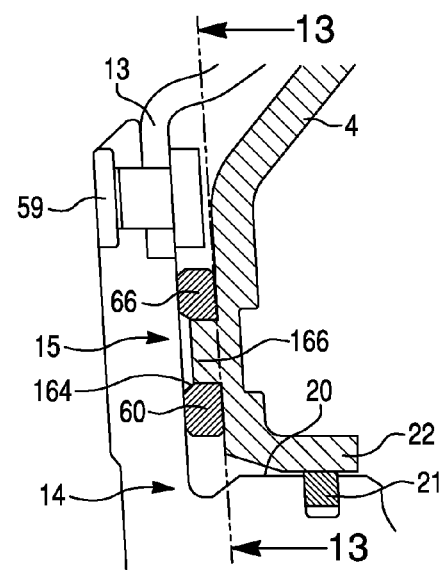

In a variant as depicted in FIGS. 11 to 13, the fluidtightness of the piston 4 can be preserved, the studs 166 each entering an emerging hole 164 produced in the friction washer 60, possibly divided, so that the friction surface is slightly reduced.

Figure 14:
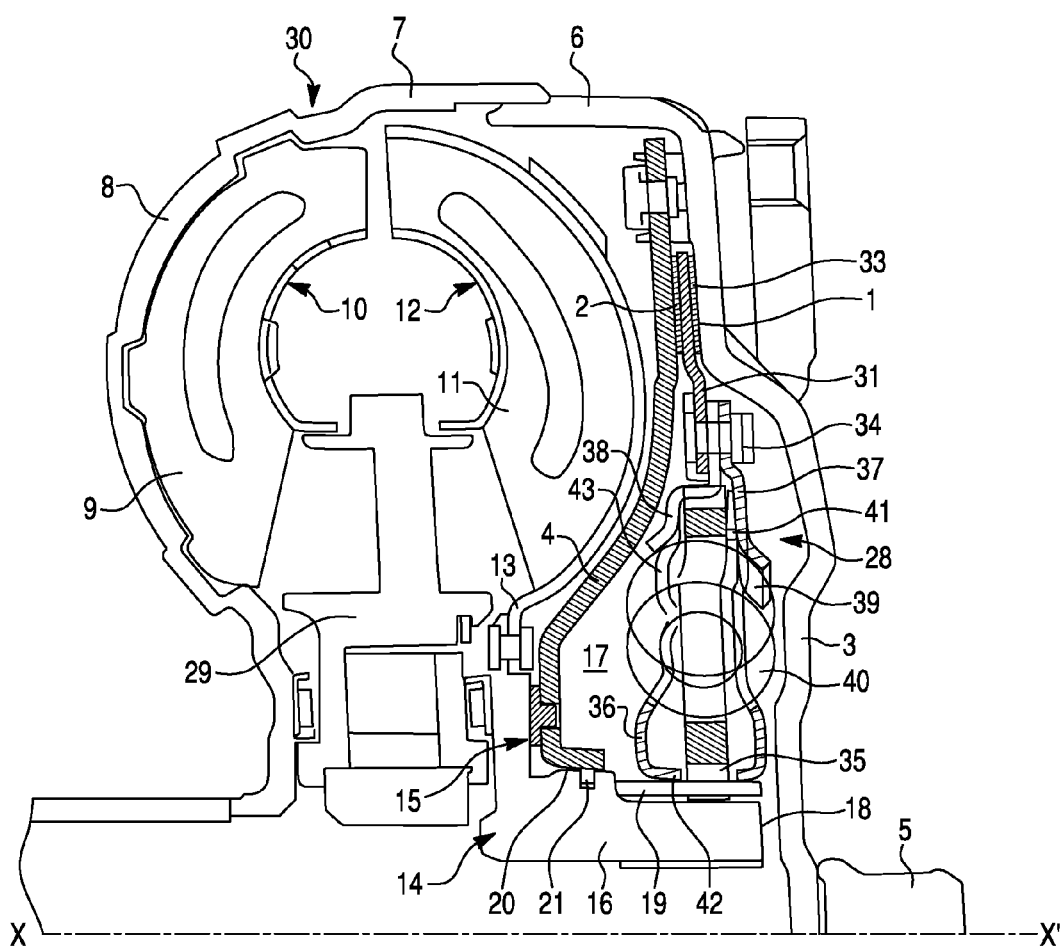
Figure 15:
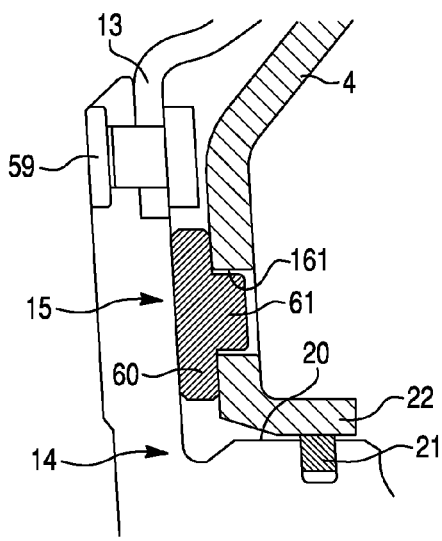

Naturally the emerging hole 164 can be produced in the piston 4, as can been seen in FIGS. 14 and 15, the studs 61 each entering an emerging hole 161 in the piston 4.

Figure 16:
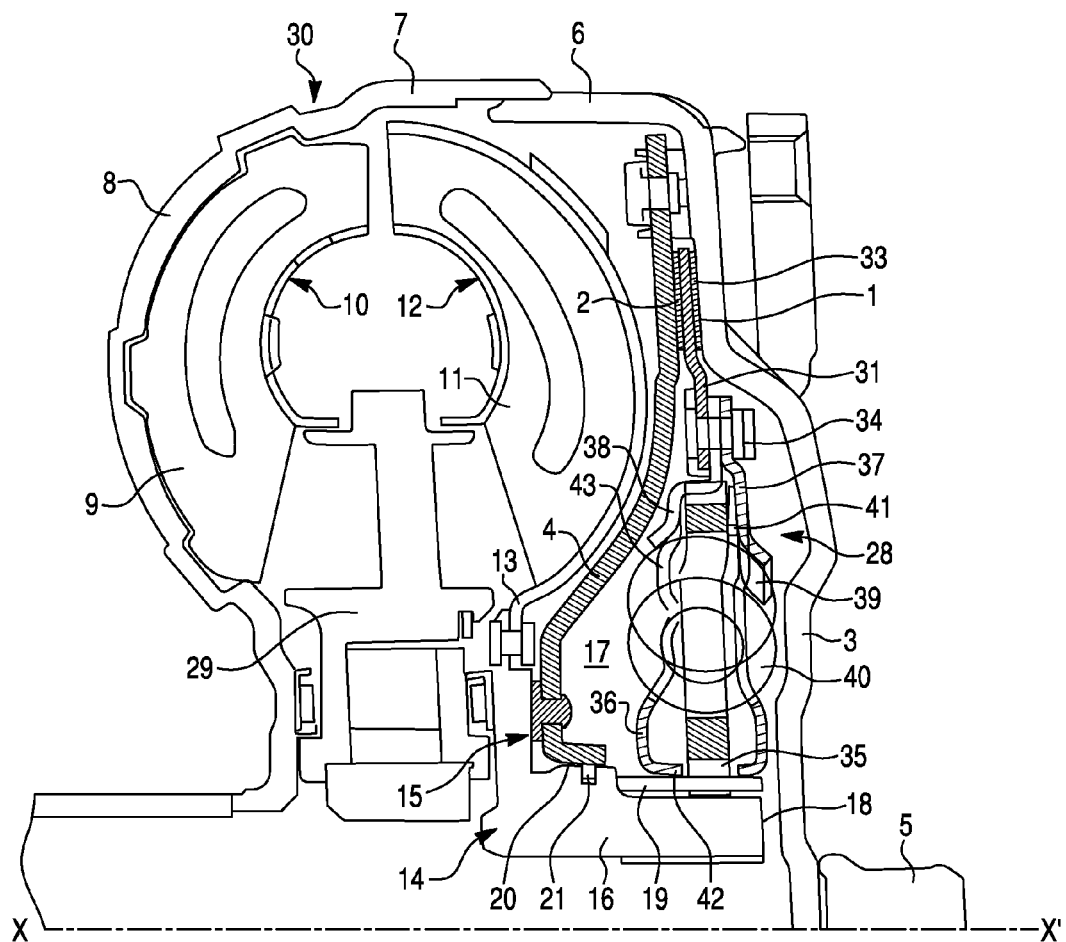
Figure 17:
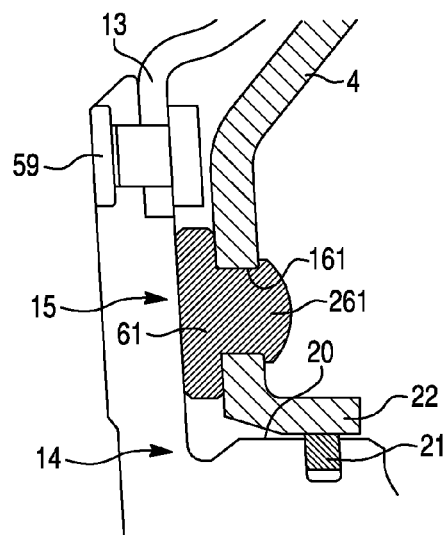

As mentioned above, these friction means 60 have at least one friction element like the washer visible in FIG. 4, this element is preferably based on plastics material. Thus, in the embodiments in FIGS. 16 and 17, the studs 61 are extended in order to pass through the holes 161, the free end of the studs 61 is deformed hot in order to form a rivet head 261. In this way a riveting of the friction means 60 on the piston 4 is effected, the seal thus being ensured.

Figure 18:
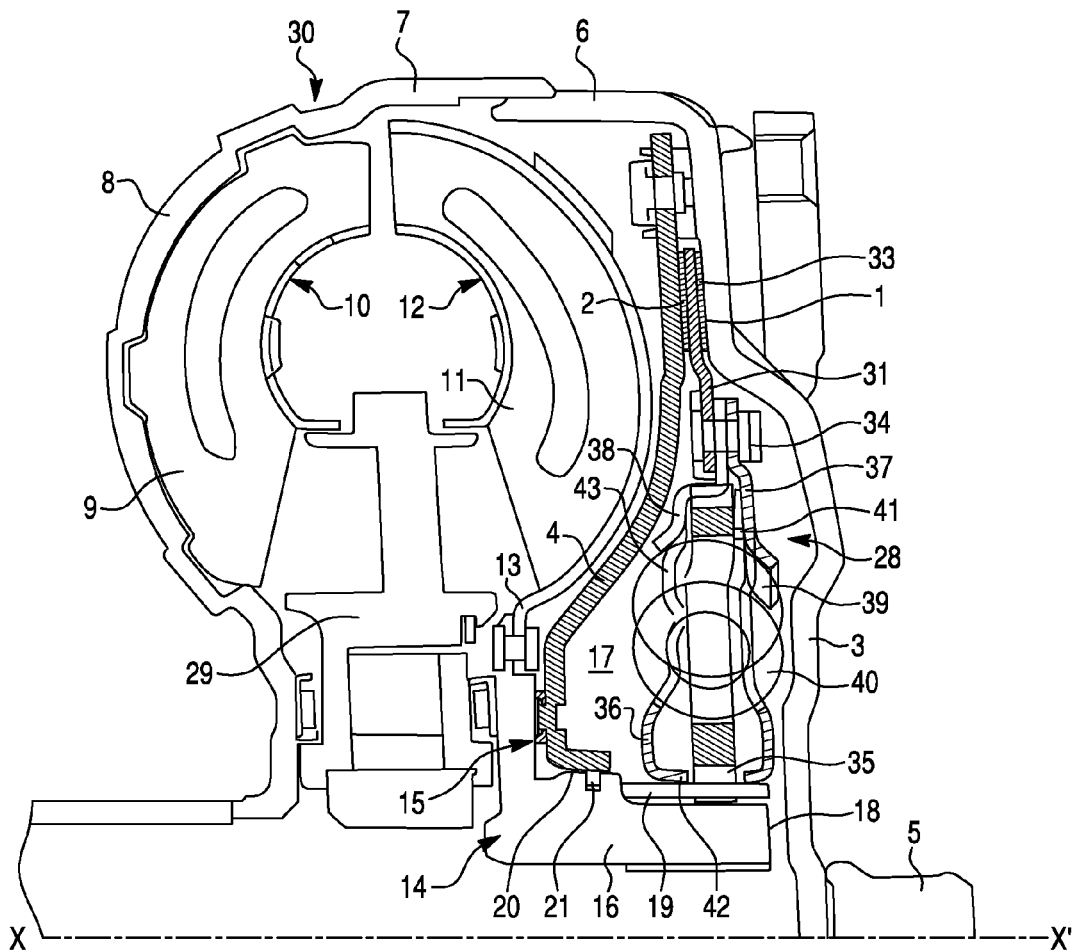
Figure 19:
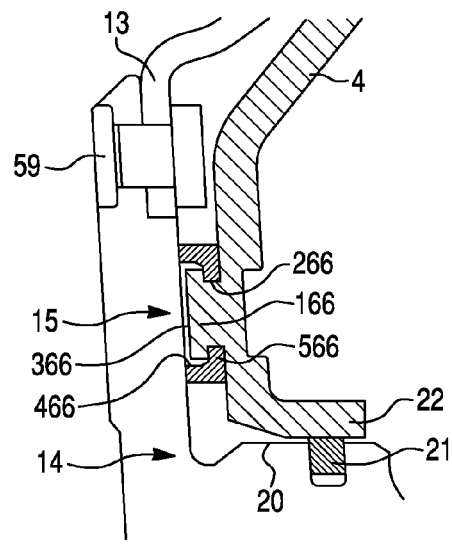

In a variant the piston 4 carries at least one rivet for fixing the friction means 60, this rivet is in a single piece with the piston 4. Thus, in FIGS. 18 and 19, the projection 166 is extended in order to pass through an opening 266 in the friction washer 60 and be deformed in order to form a rivet head 366 housed inside a hollow housing 466 with an outside diameter greater than the diameter of the opening 266, so that a shoulder 566 is created by means of the changing diameter, the head 366 being in contact with the said shoulder 566.

Figure 20:
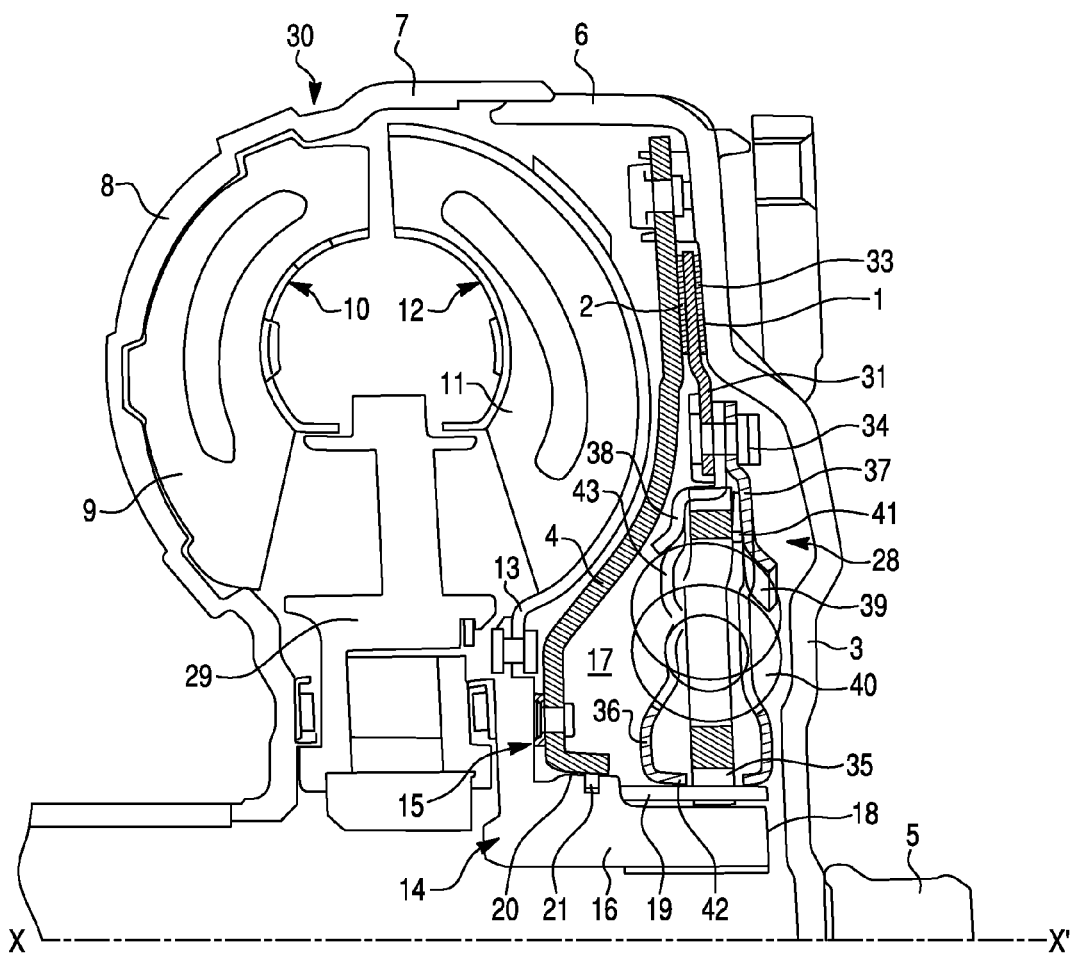
Figure 21:
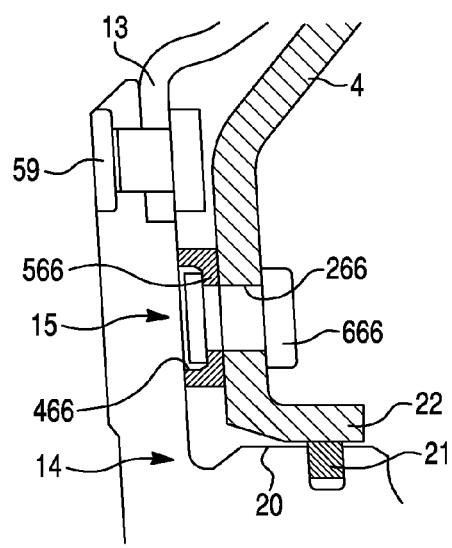

In a variant as depicted in FIGS. 20 and 21, the rivet 666 is attached to the piston 4. This rivet 666 passes through the opening 266 and its head is deformed in contact with the shoulder 566 of the housing 466 in order to effect the riveting, during the riveting operation the shaft of the rivet expands radially, thus providing the seal with the edges of the opening 266 in the piston 4.

Naturally the rivet does not necessarily pass through an opening in the friction means 60. Thus, in FIGS. 22 to 24, a stud 166 is deformed in contact with a shoulder 766 delimited by a countersink 866 which the friction washer 60 has at its external periphery, the studs 166 therefore centering the washer 60, and the head 966 of the rivet is engaged in a countersink 866 in the friction means 60 in order to immobilise axially and/or in rotation the said friction means 60 between on the one hand the head 966 of the rivet and on the other hand the piston 4.

Figure 22:
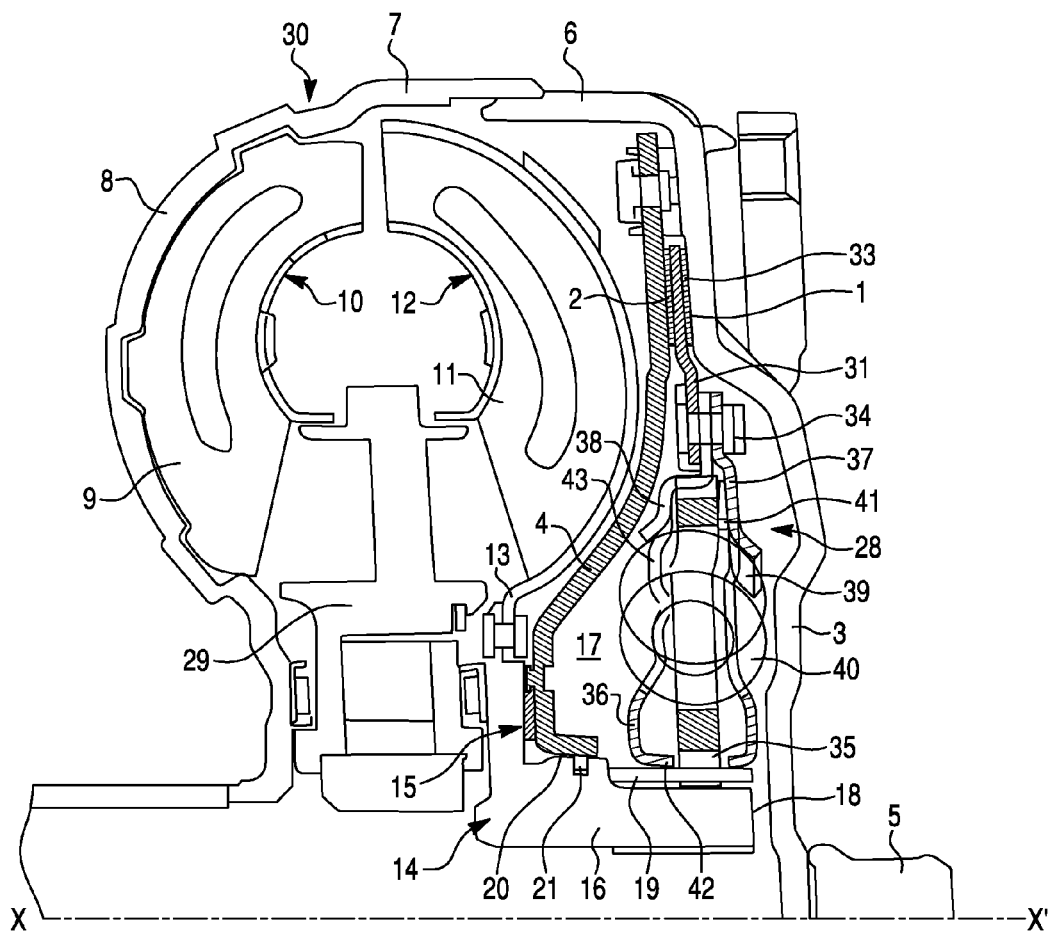
Figure 24:
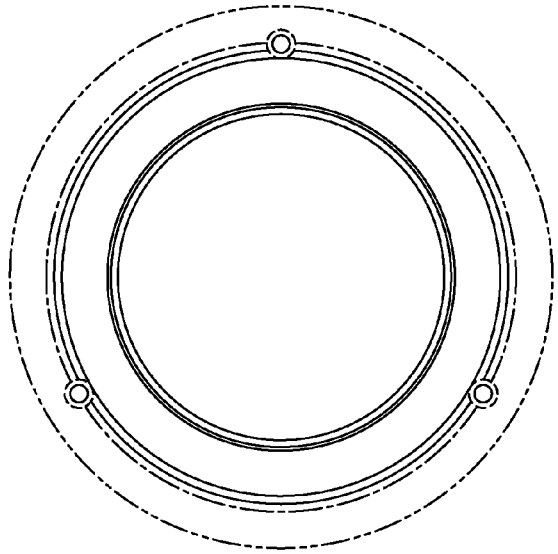
FIG. 24 is a view in section along the line 24-24 in FIG. 23.
Figure 23:
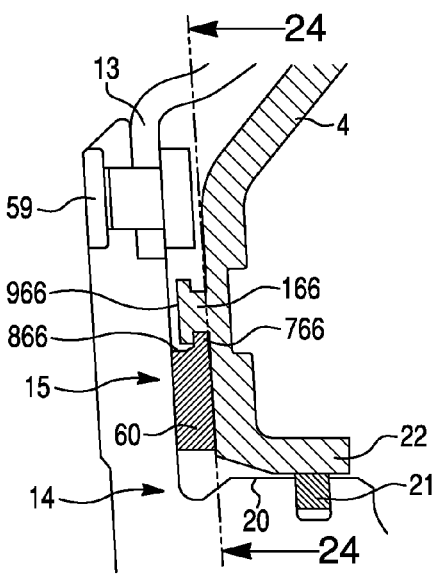

As will have been clearly understood, it is advantageous for the projection to issue directly from the piston 4, this projection being either directed towards the wall 3 in order to form a blind hole 62, or directed in the opposite direction as can be seen in FIGS. 22 to 24.

Figure 25:
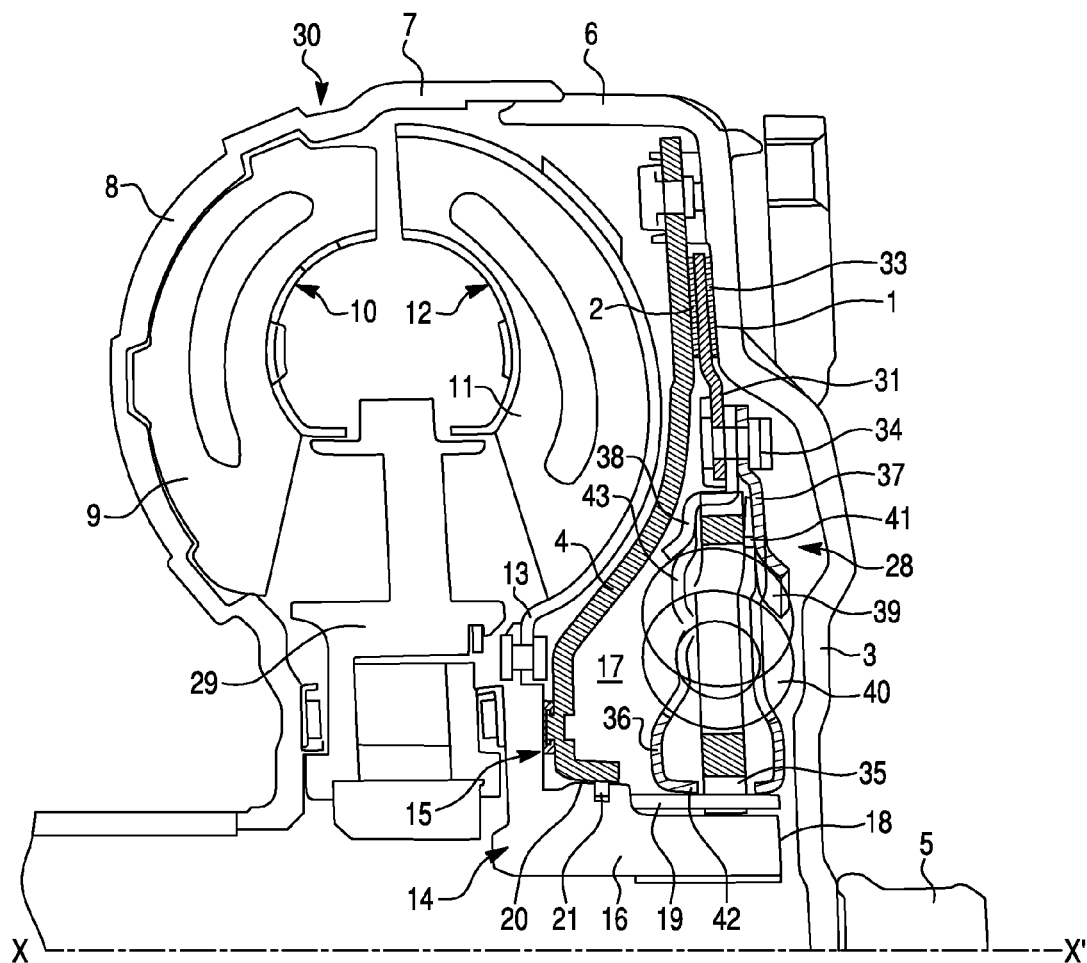
Figure 26:
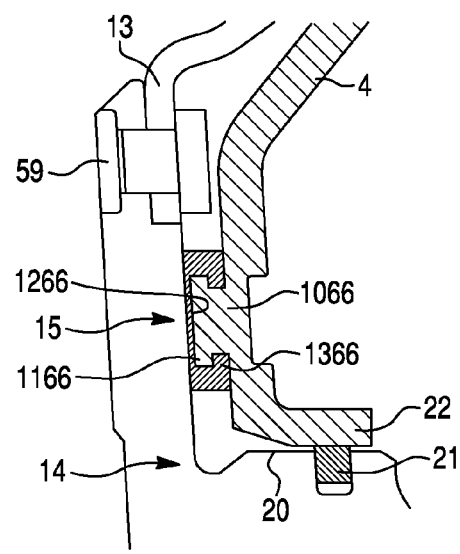
Figure 27:
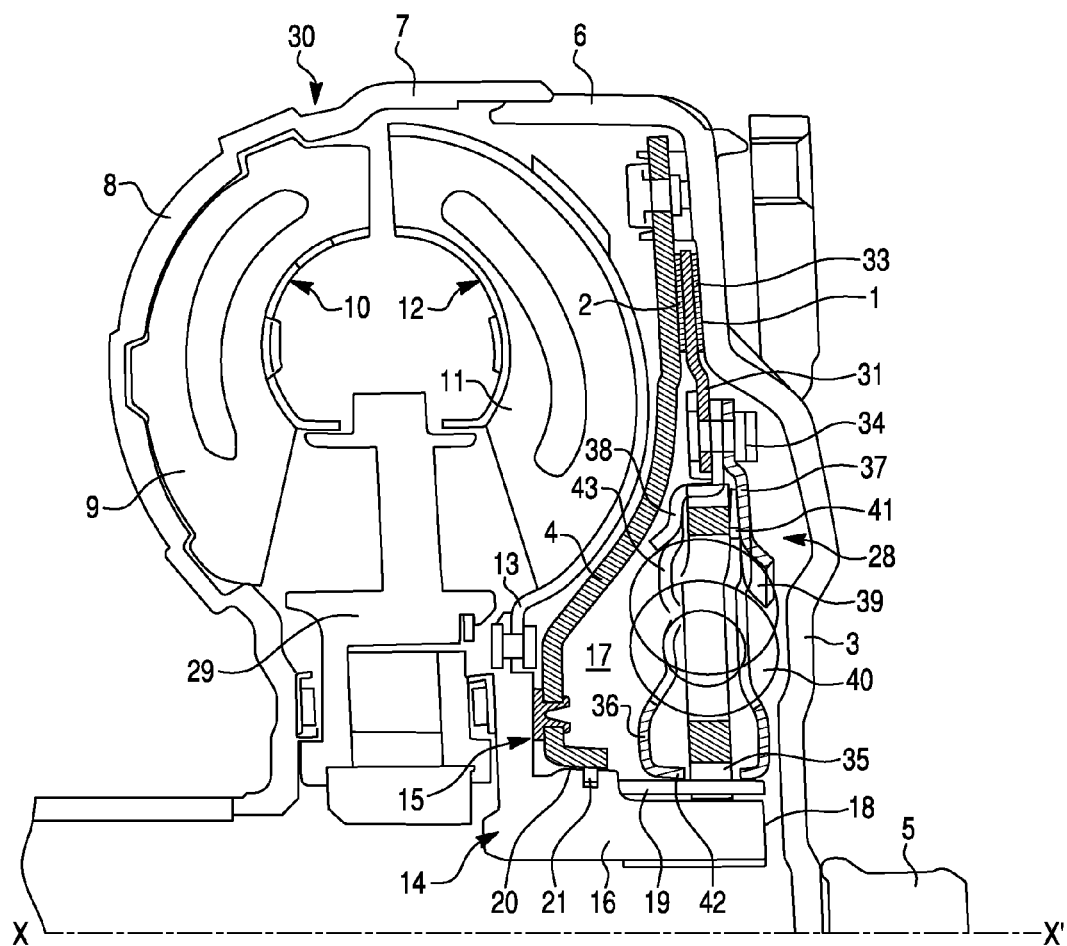

In fact it is possible to create connections by riveting but also by overmoulding or snapping on. In FIGS. 25 and 26, the projection 1066 from the piston 4 has an end collar 1166 with a larger diameter so that the friction means 60 can be moulded onto the projection 1066 on the piston 4. In this case the material of the friction means fills in the space between the piston 4 and collar 1166. The collar 1166 is thus embedded in the friction means 60. As a variant the friction means 60 can be attached by snapping onto the projection 1066 provided with its collar 1166 constituting a protrusion.

Thus the projection 1066 is engaged in a hole 1266 in the friction means 60, for example with a notched contour. As can be seen more clearly in FIG. 26, the friction means 60 has at least one lip 1366 engaged in a groove in a projection 1066 belonging to the piston 4, this groove being delimited by the piston 4 and protrusion 1166. In a variant the friction means 60 has at least one elastic lug engaged in the hole 161 in the piston 4 and provided with claws at its free end.

Figure 28:
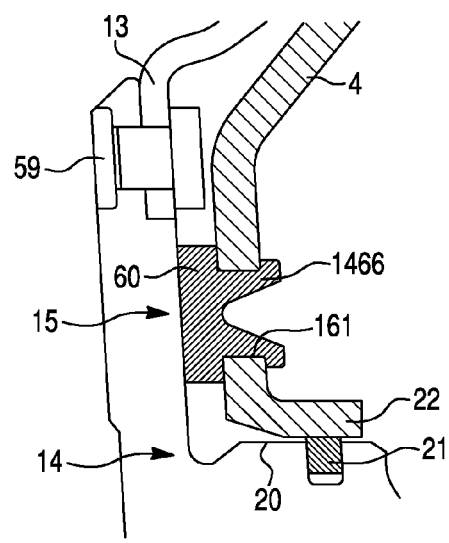

Thus in FIG. 28 the washer 60 has a plurality of lugs 1466 with claws, passing through the hole 161, this hole is advantageously splayed in the direction of the flange 15 so that the lugs 1466 are allowed to be retracted during their forcible engagement in the hole 161 and then to be deployed outwards as soon as the claws on the lugs 1466 emerge on the other side. These claws come into engagement with the face of the piston turned towards the wall 3.

Figure 29:
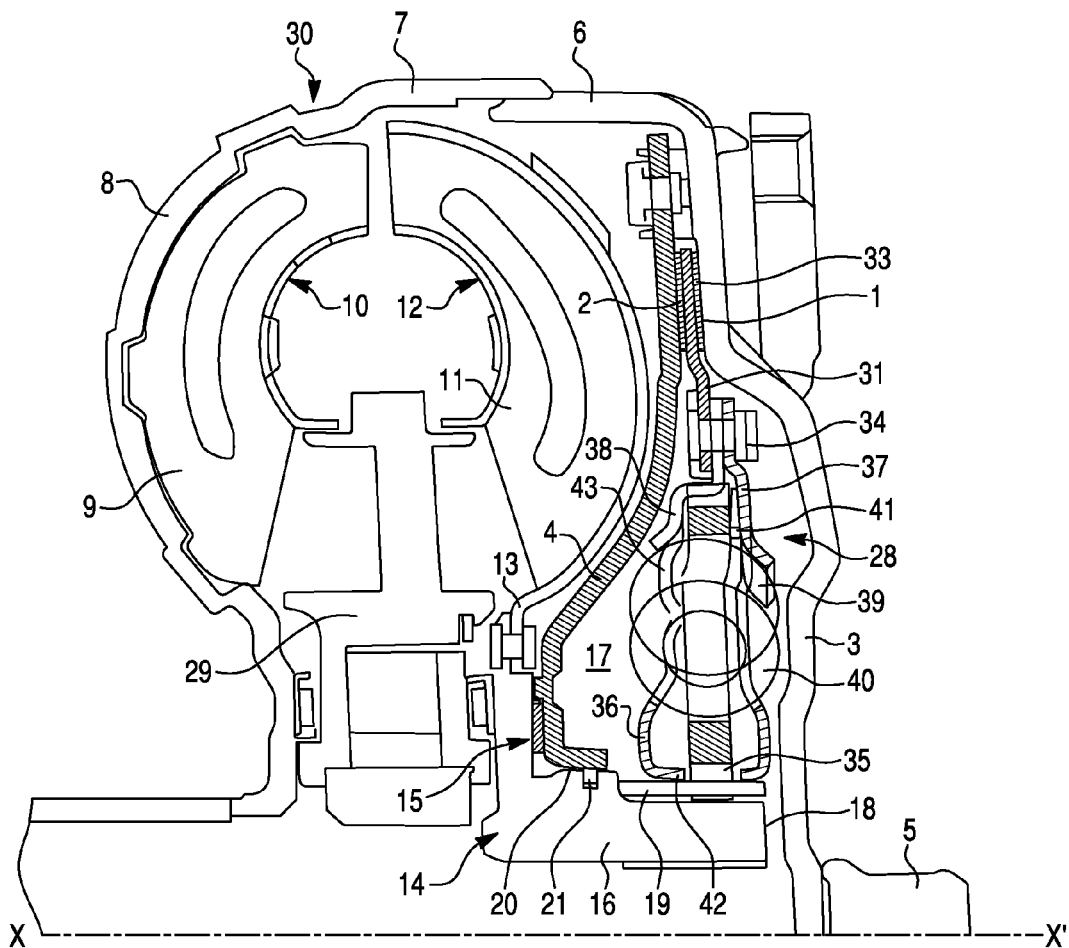
Figure 30:
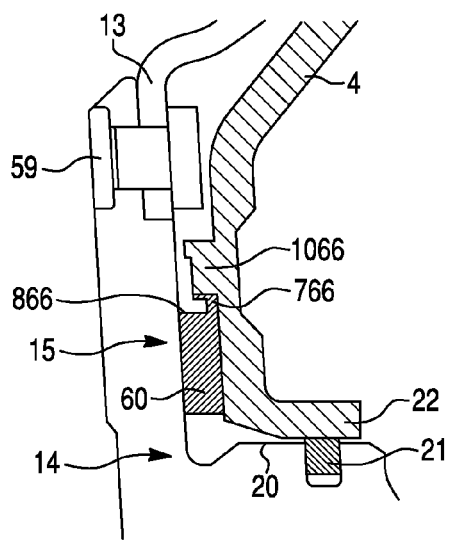

Snapping-on means thus act between the piston 4 and the friction means 60. Naturally crimping means can act between the piston 4 and the friction means 60. Thus in FIGS. 29 to 30 the friction washer 60 has a shape identical to that in FIGS. 22 to 24 and the projection 1066 has flutes intended to cut furrows at the external periphery of the washer 60.

Figure 31:
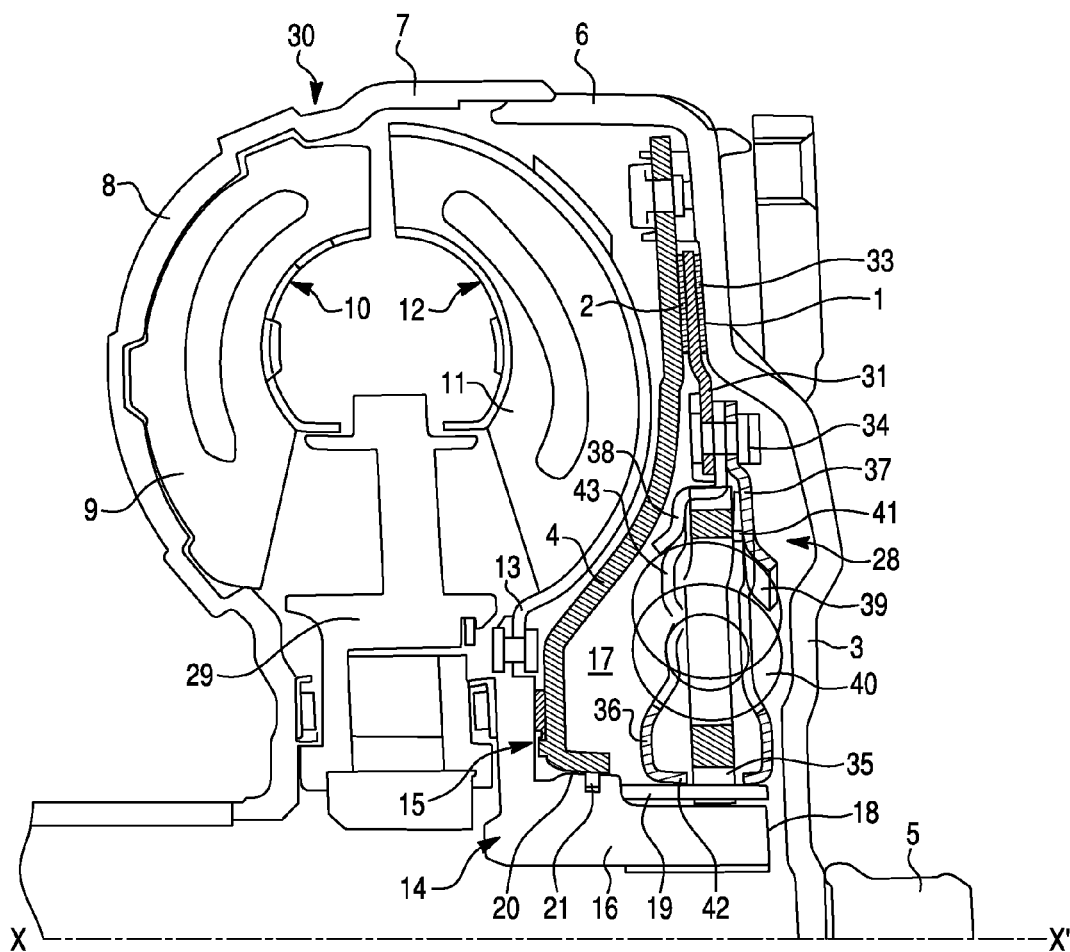
Figure 32:
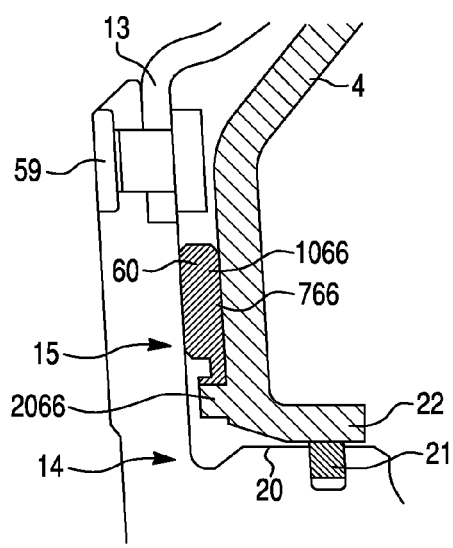
Figure 33:
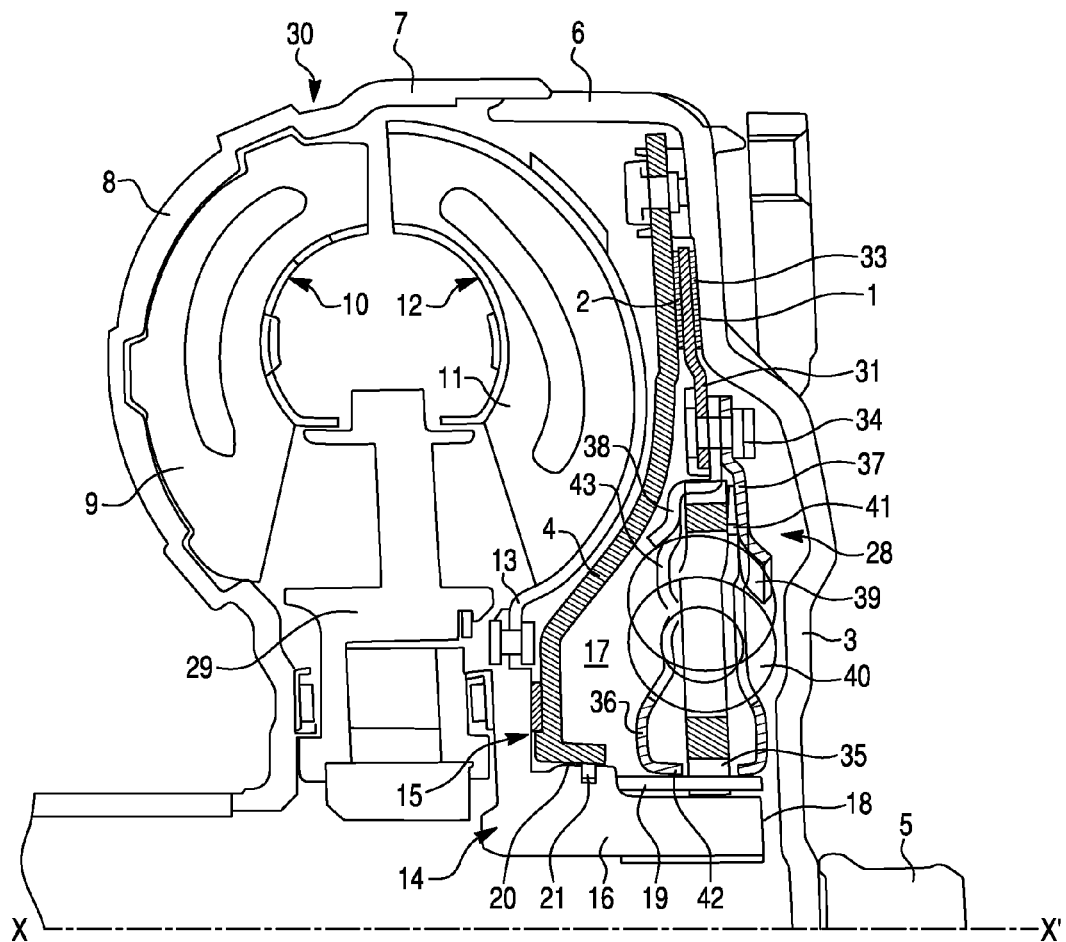
Figure 34:
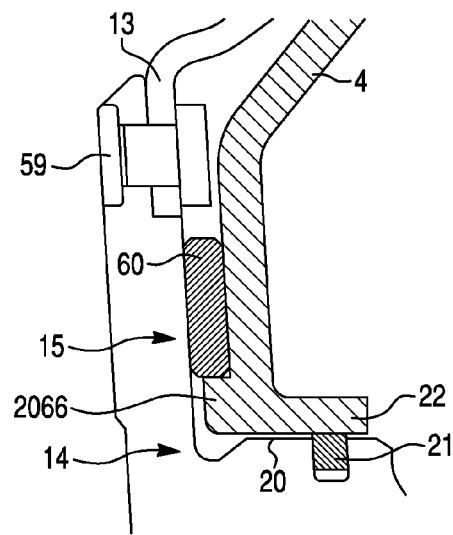

Thus the washer is forcibly engaged on the projections so that the washer is connected with respect to rotation to the said projection which is harder than it, furrows being formed at the external periphery of the washer 60. The material at the end of the projection can then be folded down in contact with the shoulder 766. The piston 4 has at least one projection deformed by flow of material in contact with a surface (the shoulder 766) on the friction means 60 turned in the opposite direction to the piston. The surface 766 is formed by means of a reduction in thickness. Naturally this reduction in thickness can be produced as can be seen in FIGS. 31 and 32 at the internal periphery of the washer 60, the countersink then being produced at the internal periphery of the washer 60. The projection 2066 then consists of an axially oriented annular flange which the piston 4 has at its internal periphery. This projection is fluted and deformed in contact with the shoulder on the washer 60 turned towards the shield 15. This flange can serve solely to centre the washer 60, as can be seen in FIGS. 33 and 34, the washer 60 then having no reduction in thickness.

As a variant the flange can be threaded externally whilst the friction washer is threaded internally in order to form a connection of the nut and screw type.

The piston 4 can be provided locally with hollows 400 extending radially as can be seen in FIGS. 35 to 37, the hollows 400 affect the flange 2066 and project radially with respect to the washer 60, thus allowing a circulation of oil between the internal and external peripheries of the washer 60. This circulation of oil creates a film of oil between the piston 4 and the friction washer 60, so that wear between these two elements is reduced, the friction washer 60 preferentially rubbing on the shield 15. The movement of the piston 4 in the direction of the shield 15 is easy and is not interfered with by the presence of oil between the piston 4 and shield 15. Such an arrangement is also applicable to the other embodiments. The face of the washer 60 turned towards the shield 15 can be provided with grooves to allow such a circulation of oil. Naturally grooves can be provided on both faces of the friction washer 60. When the friction means 60 is divided, the automatic result is a circulation of oil between the external and internal peripheries of the friction means and therefore the creation of a film of oil between the friction means and the transverse surface of the hub.

Thus the friction means has at least one passage between its internal and external peripheries to allow a fluid to pass. In one embodiment, the friction means consists of a washer having at least on one of its faces a passage such as a groove extending from its internal periphery to its external periphery.

Figure 38:
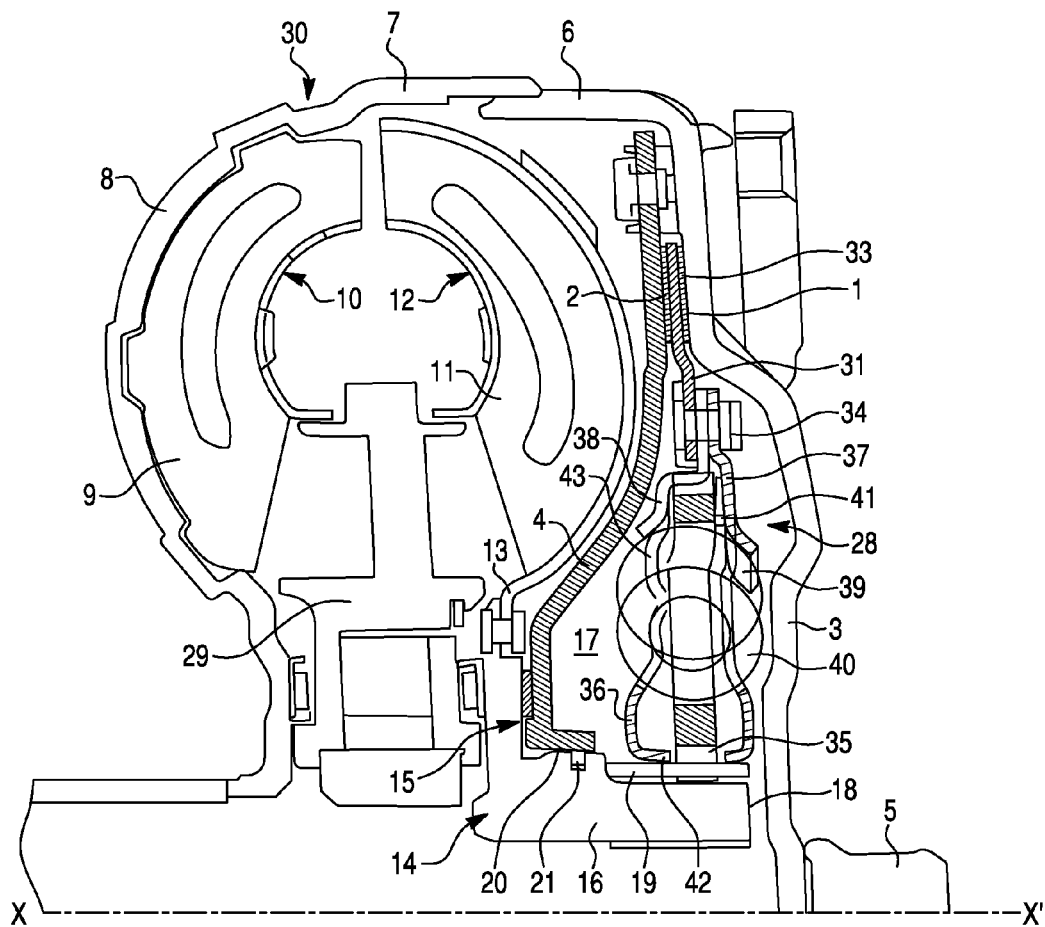
Figure 40:
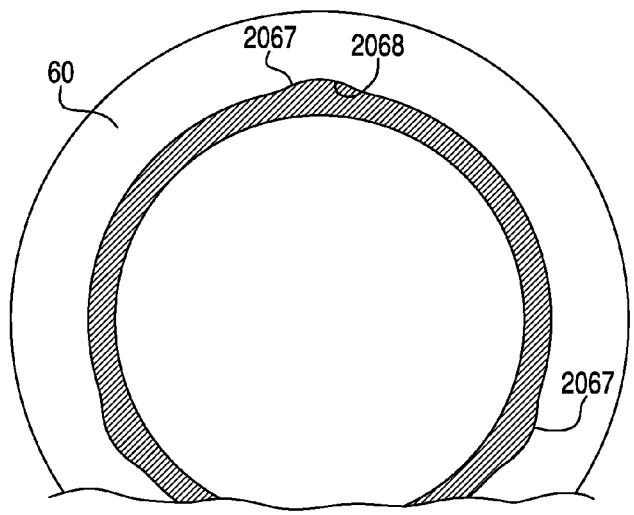
FIG. 40 is a view in section along the line 40-40 in FIG. 39.
Figure 39:
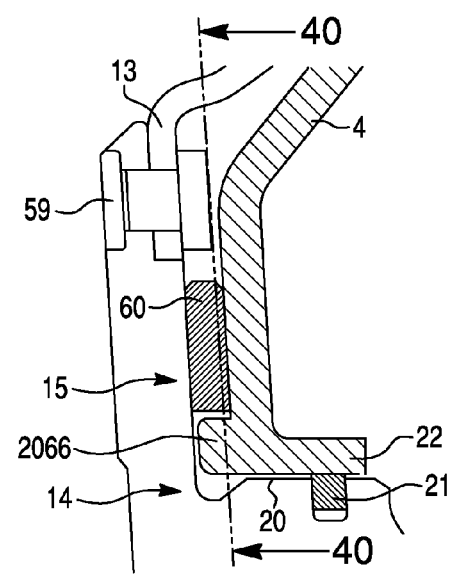

In FIGS. 38 to 40, the flange 2066 can be provided with projections 2067 each engaged in a complementary notch 2068 formed in the internal periphery of the washer 60, which is thus connected with respect to rotation to the piston 4 by cooperation of shapes, whilst being carried by the latter as can be seen in FIGS. 33 to 37.

Naturally all combinations or modifications are possible.

Figure 41:
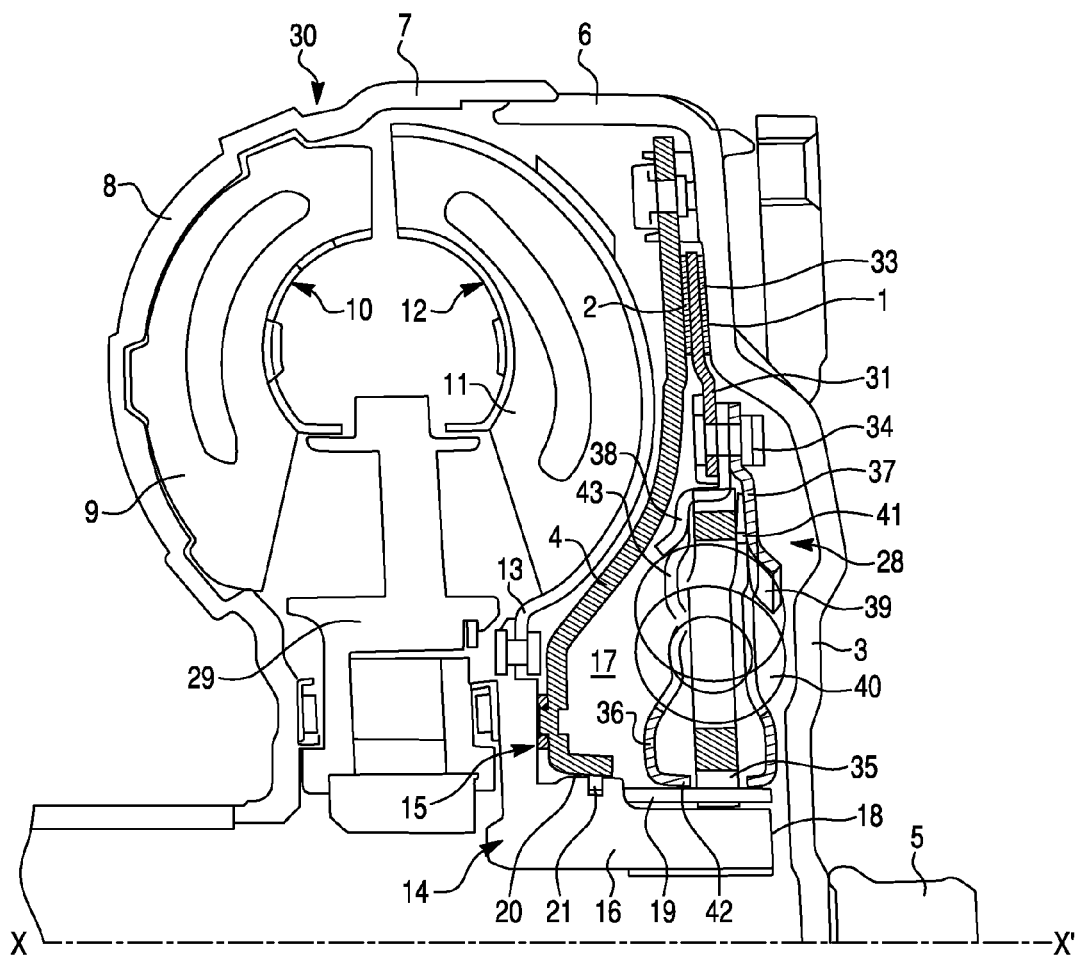
Figure 42:
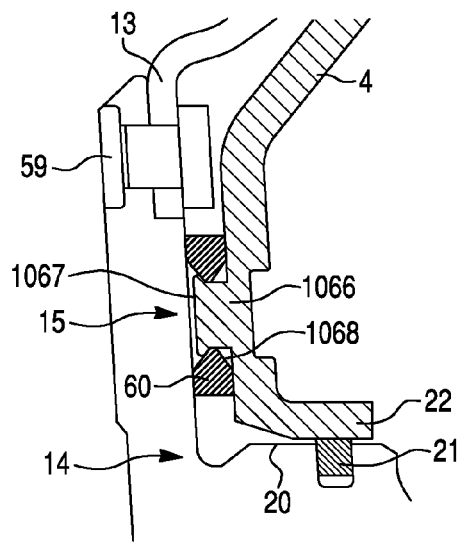

In FIGS. 41 and 42, the protrusion on the projection 1066 is not necessarily in the form of a collar but can be produced as a rounded profile as can be seen at 1067 in FIG. 42 and the internal bore of the passage hole produced in the washer 60, for entry of the projection 1066, can have at the centre an annular spike so that the mounting of the washer 60 is effected by application of a pressure on the washer 60 leading to a buttoning, that is to say a particular form of snapping on, the spike entering the groove delimited by the collar 1067 and piston 4.

Figure 43:
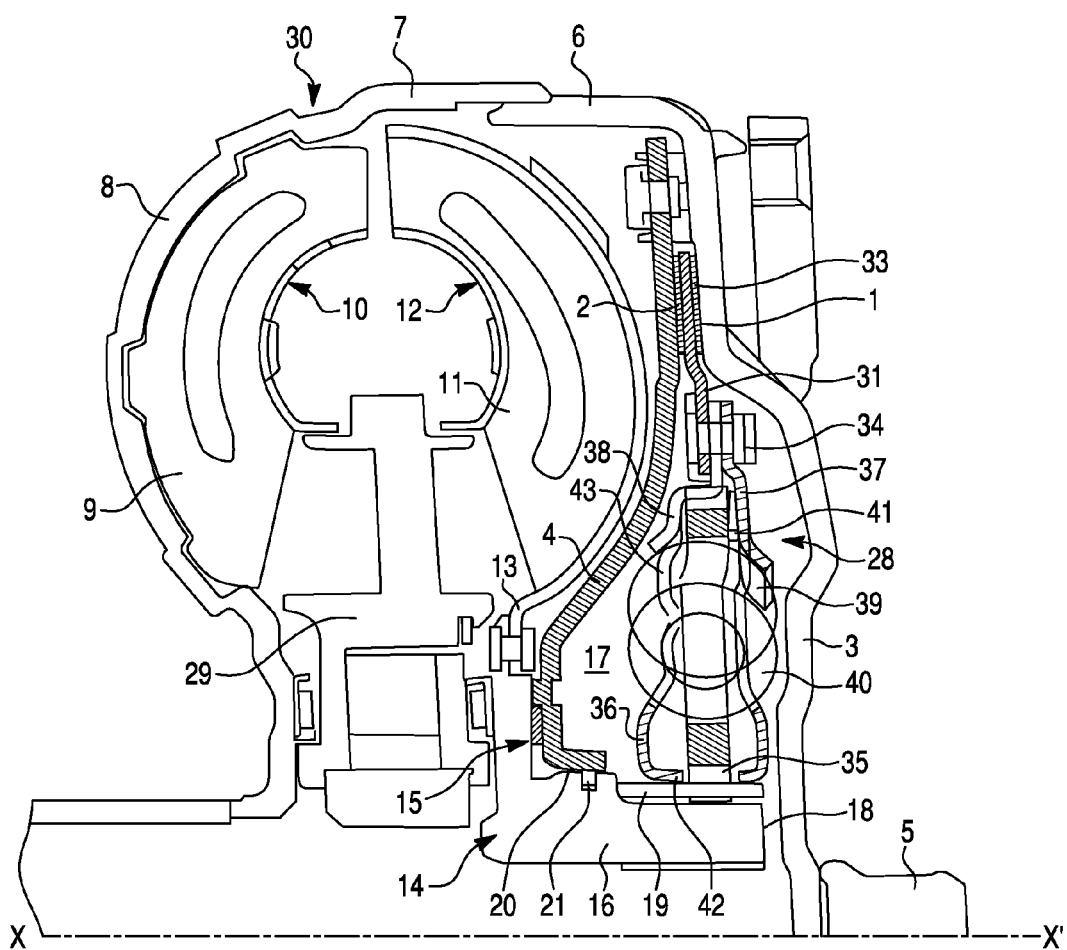
Figure 44:
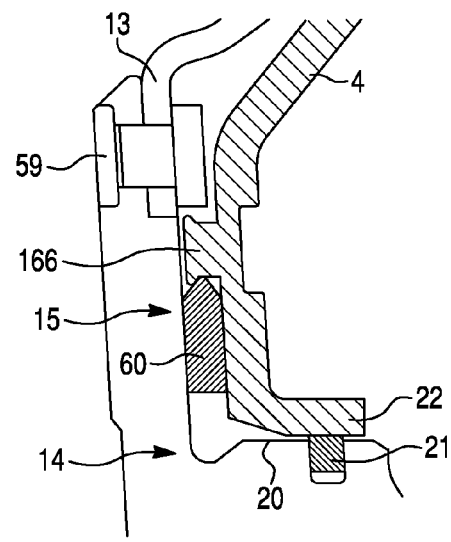

The washer 60 can be bevelled at its external periphery for its fixing by riveting to the piston 4, as can be seen in FIGS. 43 and 44. The embodiment in these FIGS. 43 and 44 also makes it possible to effect a mounting by snapping on since the external periphery of the washer 60 consists of a rounded part connected to the bevel able to cooperate with the protrusion on the projection 1066.

Figure 45:
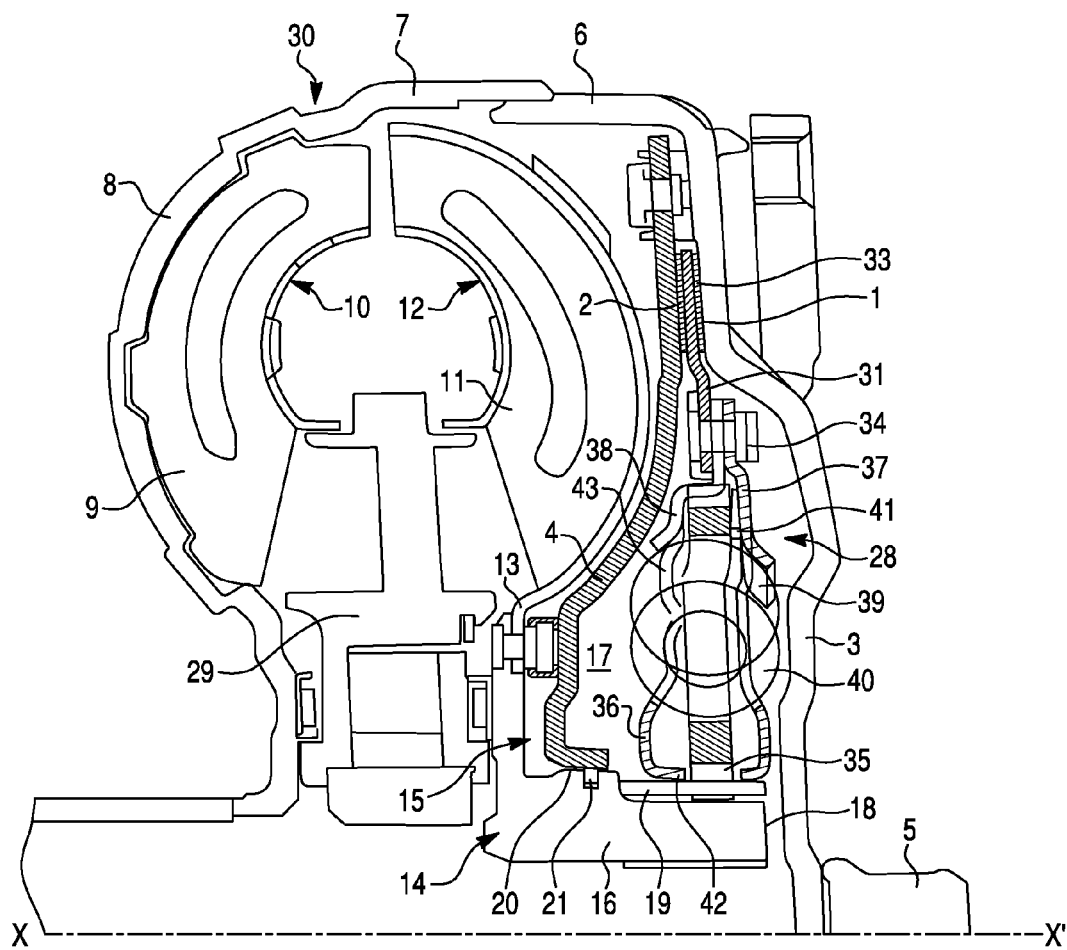
Figure 47:
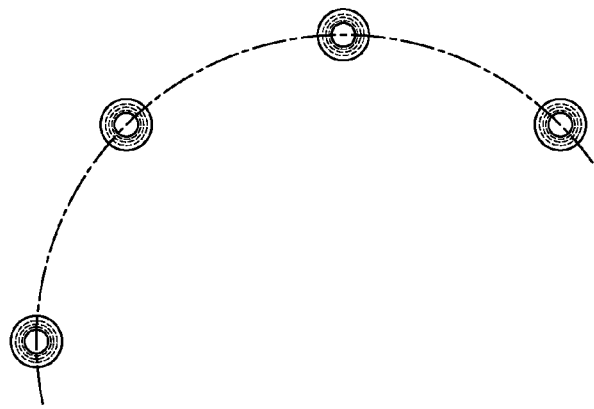
FIG. 47 is a view showing the distribution of the rivets provided with the friction means.
Figure 46:
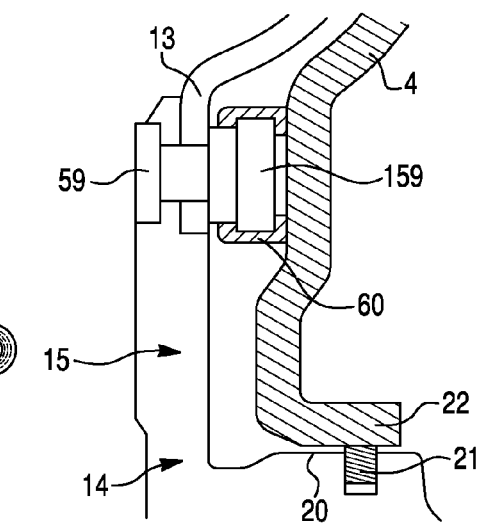

The friction means 60 can be carried by the hub 14, this friction means 60 can be connected with respect to rotation to the shield 15 by means of studs engaged in blind holes in the shield 15 but advantageously in order, as in the previous figures, not to have to machine the hub and thus simplify the components of the apparatus whilst reducing the cost without impairing the performance thereof, the friction means 60 will be carried by at least one rivet 59 serving to fix the turbine wheel 12 to the shield 15. More precisely, as mentioned previously, the rivet 59 serves to connect the annulus 13, which has at its internal periphery the turbine wheel 12, to the shield 15 provided with a countersink for this purpose, as can be seen more clearly in FIGS. 45 to 47. To do this the rivet 59 has a projecting head provided with a protrusion 159 for fixing the friction means 60. In FIGS. 45 to 47, the protrusion 159 is moreover of constant width.

In the embodiment in FIGS. 45 to 47, the friction means 60 is moulded onto the protrusion 159, in this embodiment all the rivets evenly distributed circumferentially being provided with such a protrusion 159.

Figure 48:
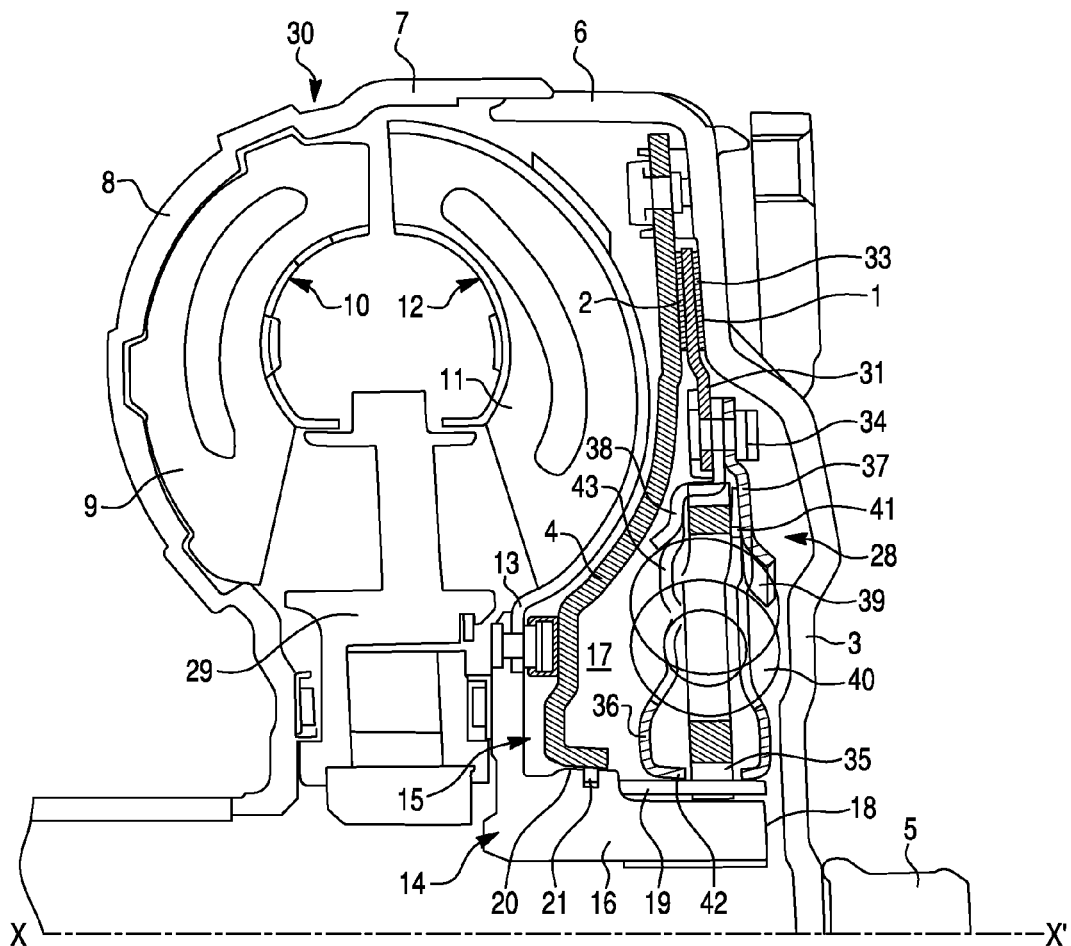
Figure 49:
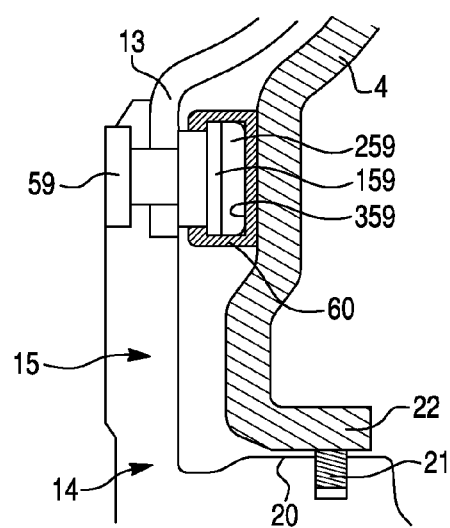

In a variant some of the rivets 58 are not provided with such a head. In a variant the protrusion 159 is less wide and is connected to the free end by a portion with a penetrating shape 259. In FIGS. 48 to 49, the portion 259 is roughly in the shape of a bevel. The friction means is then mounted, by snapping on, on the protrusion on the head 159, 259. The friction means 60 has for this purpose a blind cavity 359 open in the direction of the shield 15 of the hub 14 to house this protrusion. The cavity 359 is delimited by lugs 459 in the shape of an angle bracket, these lugs 459 are elastically deformable transversely and able to come into engagement with the face of the protrusion 159 turned in the opposite direction to the piston 4. The portion 159 thus comes into contact with the bottom of the cavity 359.

In FIGS. 45 to 49, the friction means 60 has a plurality of elements fixed to the rivet heads or a single friction means in the form of a washer or an annular sector fixed to at least two rivet heads.

Figure 50:
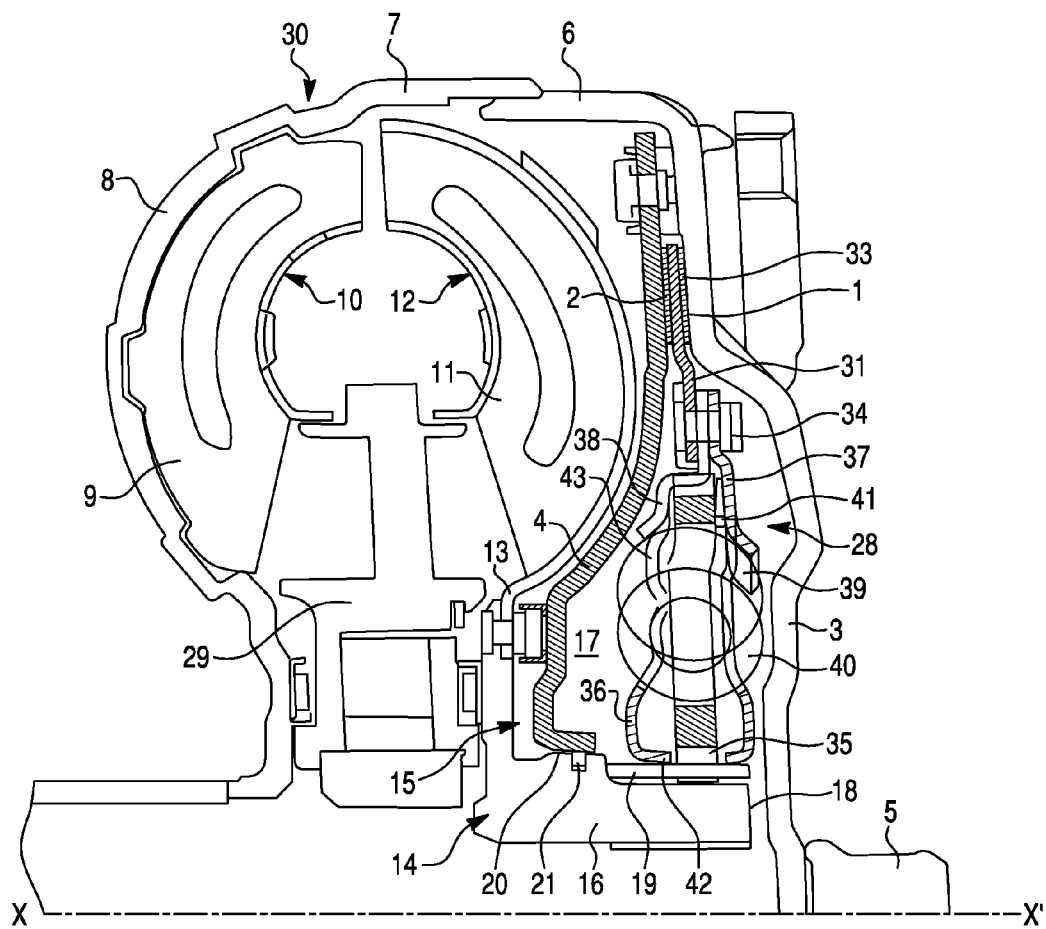
Figure 52:
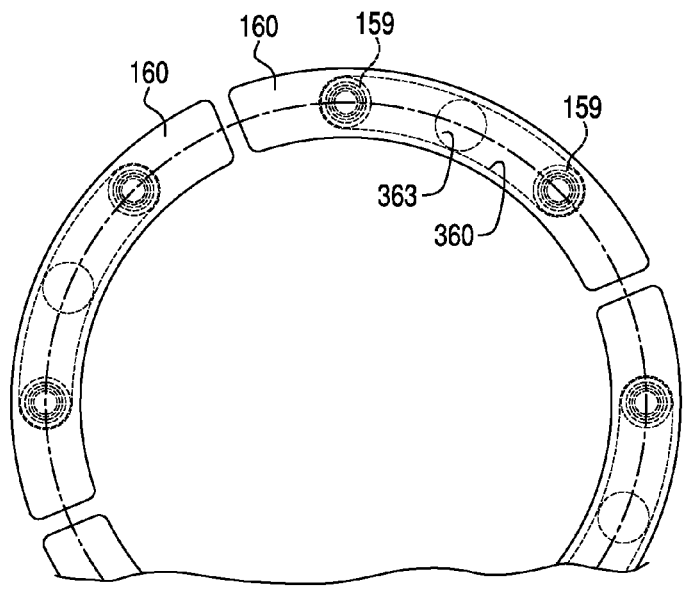
FIG. 52 is a partial view in the direction of the arrow 52 in FIG. 51 without the piston or the hub.
Figure 51:
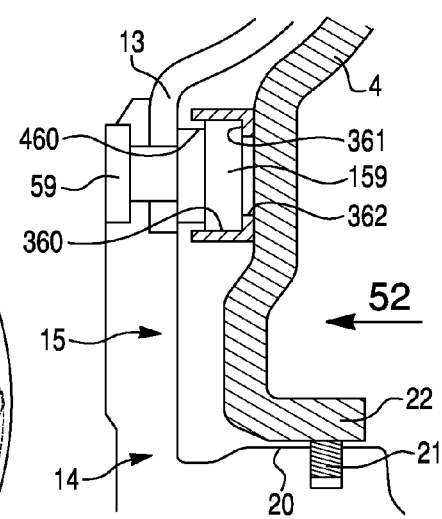

Naturally this can include one or more elements in the form of an annular sector 160 equipped in advance with rivets 59 provided with protrusions 159, as can be seen in FIGS. 50 to 52. More precisely, each friction sector has a cavity 360 circumferentially oblong in shape for housing the protrusions 159. The cavity 360 is open axially in the direction of the annulus 13 and therefore the shield 15, its opening is delimited by a lip 460 able to cooperate with the face of the protrusion turned towards the annulus 13. The cavity 360 is also delimited by a facing shoulder 361 on the lip 460. The shoulder 361 has a hole 362 at each circumferential end of the cavity 360, and centrally at 363. The central passage 363 here has a size greater than that of the holes 362. Thus the protrusion 159 on each of the two rivets, inserted in the cavity 360, penetrates through the passage 363 in the cavity and then is turned angularly towards the relevant circumferential end of the cavity 360. Each sector 160 is thus equipped for example with two rivets. Riveting on the shield 15 is then carried out by means of the holes 362 allowing the riveting tools to pass.

In a variant the cavity 360 extends as far as the circumferential ends of the sector 160 concerned. The rivets 59 being fixed in advance to the shield 15, it is thus possible to mount the rivets in advance on the shield 15 and then mount the sector 160 on the rivets by means of a mounting of the bayonet type. This type of mounting is applicable to the case where the piston carries the friction means 60, the rivets then being secured to the piston and the friction means divided into annular sectors.

Figure 53:
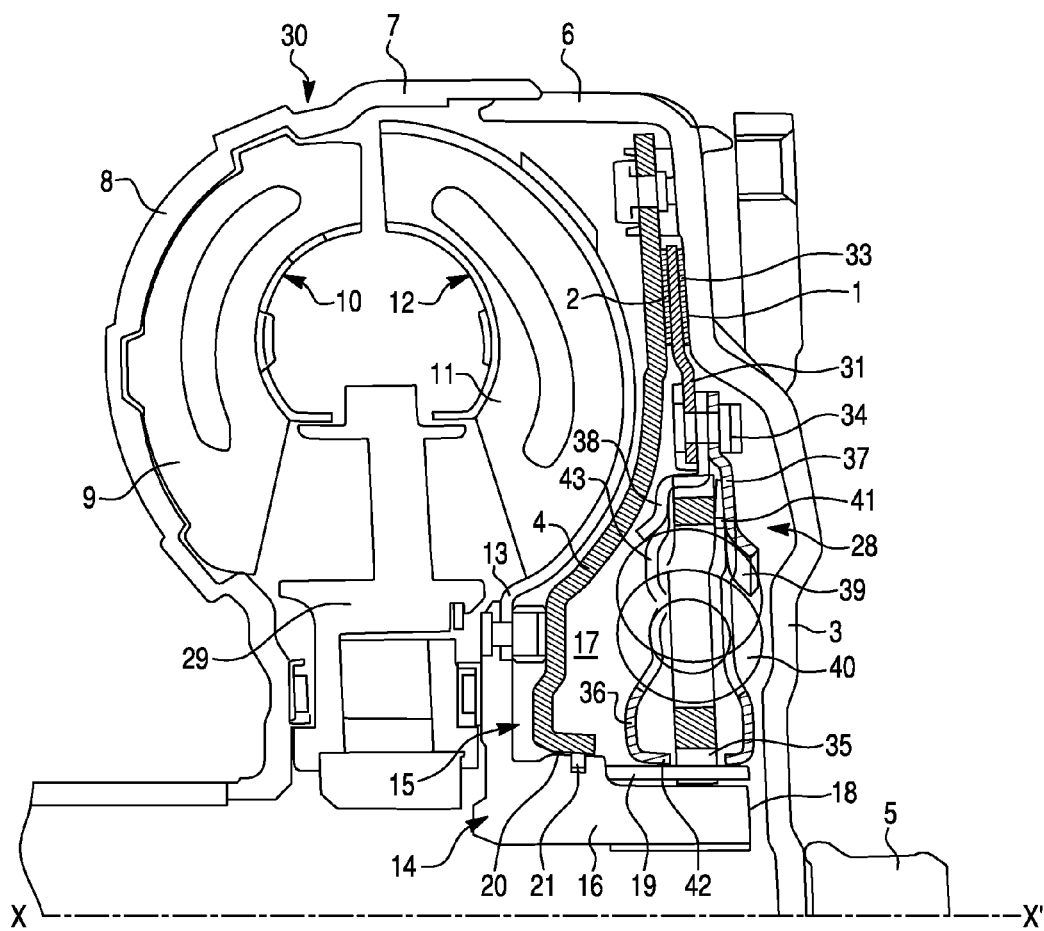
Figure 55:
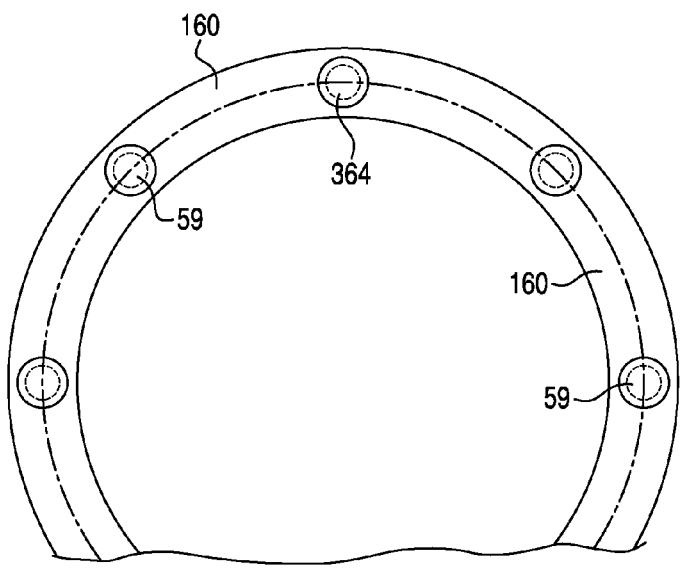
FIG. 55 is a partial view in the direction of the arrow 55 in FIG. 54 without the piston or hub.
Figure 54:
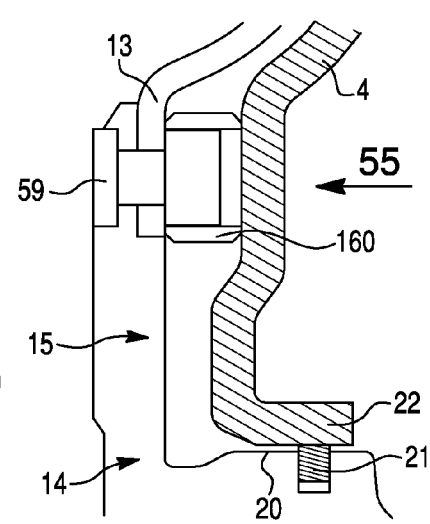
Figure 56:
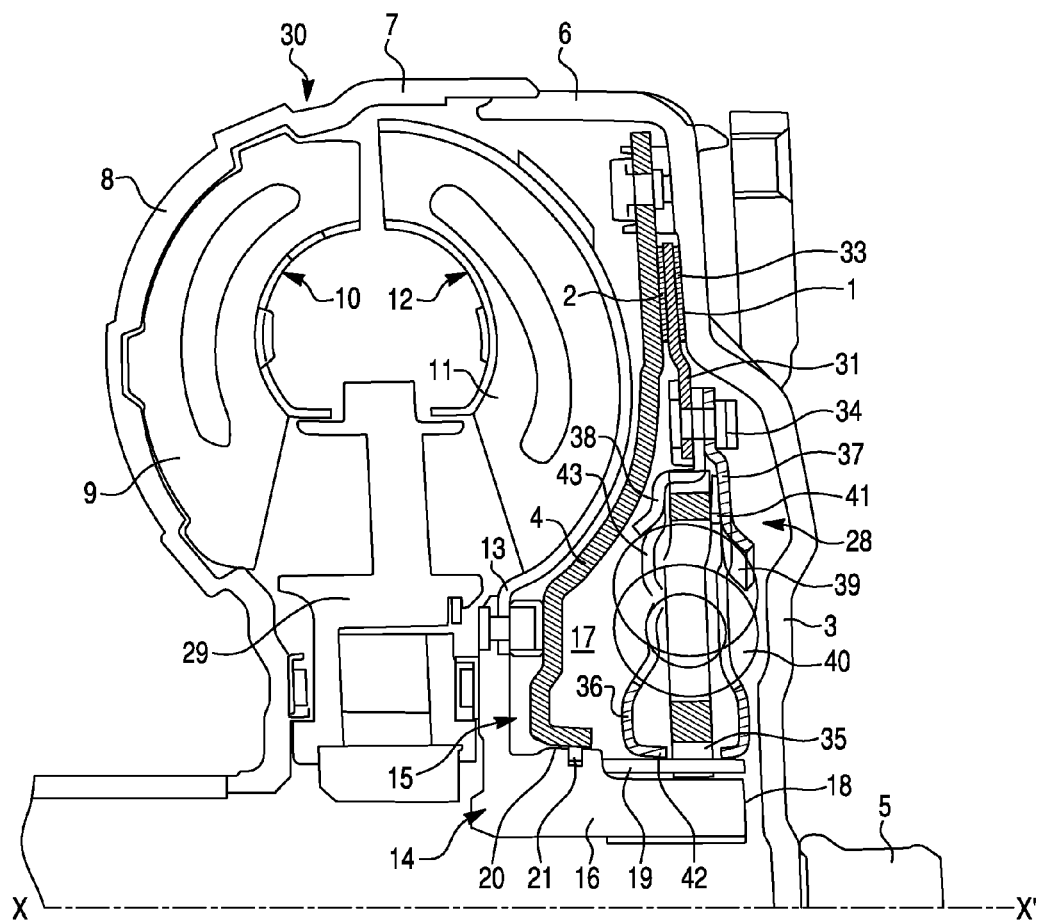
Figure 58:
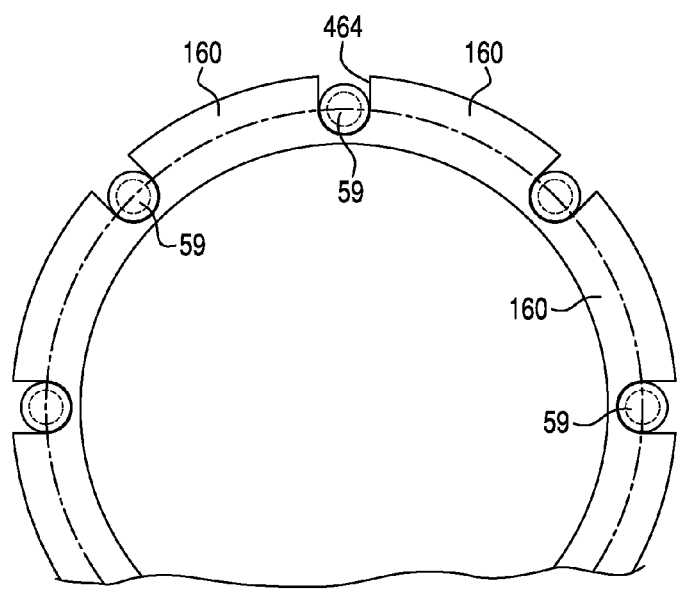
FIG. 58 is a partial view in the direction of the arrow 58 in FIG. 57 without the piston or hub.
Figure 57:
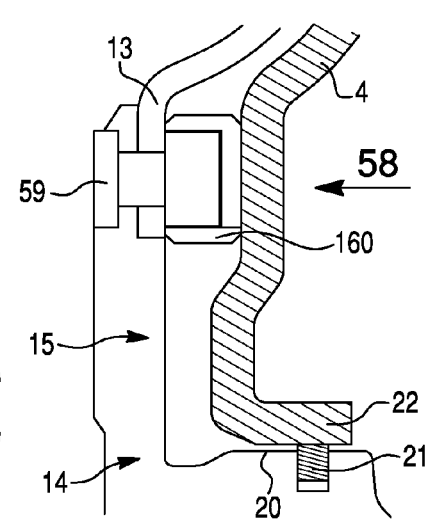

In a variant in FIGS. 53 to 55, the rivet head 59 is engaged in an opening 364 formed in the friction means, here the opening 364 is delimited by the adjacent ends of two successive sectors, these ends have a semicircular scallop so that the opening 364 is in the form of a cylindrical hole so that each sector 160 is fitted on two rivet heads. The same applies in FIGS. 56 to 58, in which the openings 464 are wider at the external periphery than at their internal periphery, as in the previous figures each sector is fitted on two rivet heads, which may be successive. The ends of the sectors 160 can have any shape enabling them to fit on two rivet heads, for example each end of each element 60 can be hollowed out in the form of a V whose size will be a function of the dimension of the rivet head. The annulus 13 can be fixed on the other side of the shield 15 and it is then the foot of the rivet which extends between the piston 4 and the shield 15, this foot can be extended in order to engage in an opening in the friction means, for example of the type in FIGS. 53 to 58.

It is clear that the tongues in FIGS. 8 to 58 can be replaced with the one in FIGS. 6 and 7. The tongues 23 therefore extend radially above the second surface 2 or opposite it as in FIGS. 6 and 7.

Naturally the friction means 60 does not necessarily cooperate with the shield 15, this friction means 60 can cooperate with a transverse surface formed in the axial part of the hub 14, for example by means of a change in diameter thereof, so that the transverse surface does not necessarily belong to the shield 15. The ferrule 22 can slide with mounting clearance along the surface 20, in this case the friction means 60 can have elastic elements in order to be able always to remain in contact with the associated transverse surface on the hub 14, for example in the embodiment in FIG. 4, each stud can be surrounded with a ring made from a material such as elastomer. The ring therefore acts between the periphery of the hole 62 and the projection 61, which allows a movement of the washer 60 with respect to the piston 4.

In all the figures, a groove is provided at the point where the shield 15 joins the axial part 16 of the hub 14. This groove reduces the mechanical stresses and prevents any interference with the piston 4, in particular when the latter has a flange 2066 as can be seen in FIGS. 34, 37 and 40.

Naturally the joint 21 can consist of an elastically deformable segment and it is to facilitate the mounting of the piston 4 and joint 21 that the piston 4 is bevelled at its ferrule 22, as can be seen in all the figures.

In the previous figures the lock-up clutch is of the two-face type since the disc 31 is intended to be between the surfaces 1, 2.

In all cases the axial bulk of the appliance is reduced at its external periphery since the guide washers 36, 37 of the torsion damper are located radially below the surfaces 1, 2. It is the tongues 23 which are located at this point.

Figure 59:
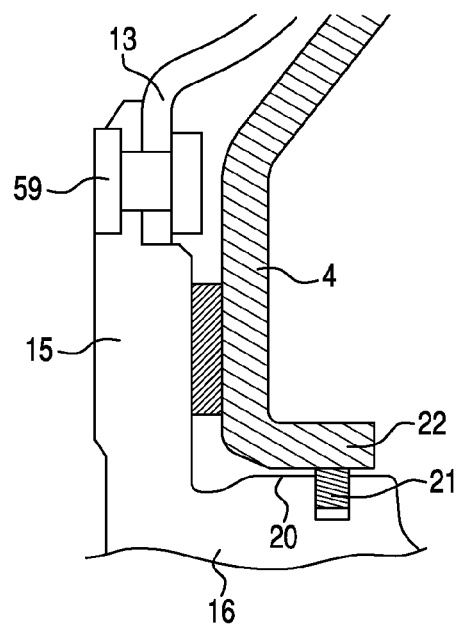
FIGS. 59 to 61 are views similar to FIG. 4 for yet other example embodiments.

Naturally (FIG. 59) the friction hub 60 in the form of a washer can be interposed freely between the shield 15 and the piston 4.

Figure 60:
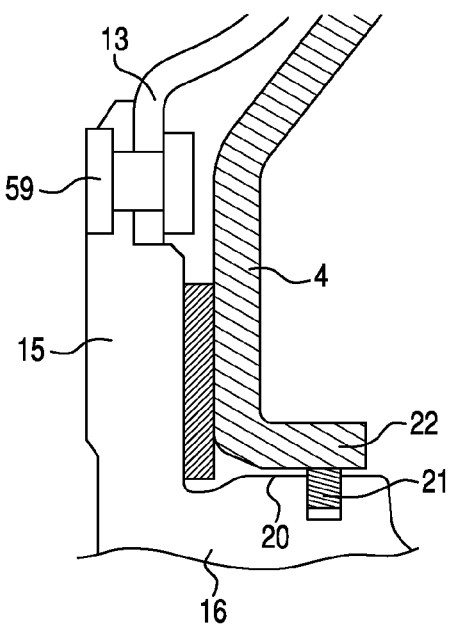

In a variant (FIG. 60) the washer 60, constituting the friction means, enters the groove present at the level where the shield 15 joins the axial part 16 of the hub. Entry into this groove is effected by force-fitting.

Figure 61:
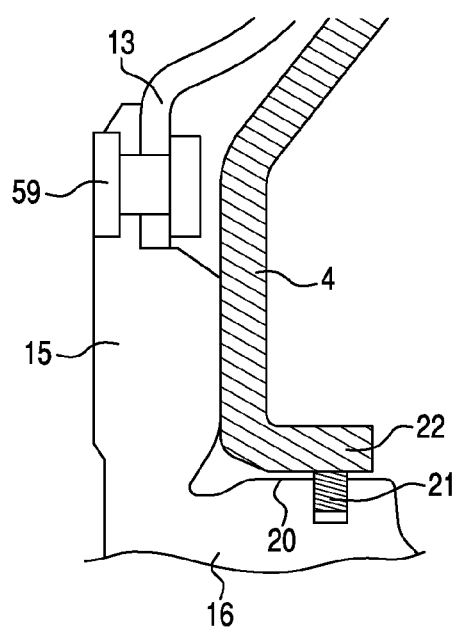

In FIG. 61 a coating 60 is deposited on the piston 4 to constitute the friction means. Naturally as a variant the covering is applied to the shield 15.

As a variant, having regard to the length of the hub 14, the torsion damper can be equipped with a predamper as described in the document FR-9900246 filed on Dec. 1, 1999.

All the dampers described in this document can be used in the present application. For more information reference should be made to this document, FIGS. 14 to 17 describing such predampers having a secondary damper plate meshing without clearance with the flutes 19 on the hub 14, whilst the damper plate 35 meshes with take up of a circumferential clearance with the flutes 19, constituting a set of teeth.

The predamper has second elastic members with lesser stiffness than the members 40. This predamper also has two guide washers disposed on each side of the secondary damper plate with the intervention of second elastic members between the secondary damper plate and the guide washers of the predamper. These second elastic members are mounted for this purpose in housings produced opposite in the secondary damper plate and the guide washers. One of the guide washers 35, 36 can constitute one of the guide washers of the predamper whose elastic members, usually in the form of coiled springs, are located radially below the springs 40.

What is claimed is:

1. Hydrokinetic coupling apparatus (1) for a motor vehicle, having a casing (30) provided with a transverse wall (3), able to be fixed with respect to rotation to a driving shaft, a turbine wheel (12) housed inside the casing (30) and fixed to a hub (14), able to be fixed with respect to rotation to a driven shaft, a first surface (1) defined by the transverse wall (3) of the casing (30), a lock-up clutch acting between said turbine wheel (12) and said transverse wall (3) and comprising a piston (4) defining a second surface (2) facing the first surface (1) for its disengageable connection to the transverse wall, wherein the piston (4) is connected to the casing (30) by tongues being axially elastic, and wherein the tongues are rigidly fixed to the piston and to the transverse wall thereby providing no degree of freedom between the tongues (23) and either the piston (4) and the transverse wall (3); wherein the tongues (23) are disposed radially opposite said second surface with respect to said piston (4), said tongues being circumferentially distributed in several sets of tongues (23) each including at least one tongue.

2. Apparatus according to claim 1, wherein the tongues (23) are tangentially oriented.

3. Apparatus according to claim 1, wherein the casing (30) has casing elements (7, 8-3, 6) each provided at their periphery with an axially oriented annular flange (7, 6) and wherein the tongues (28) are connected to one of the annular flanges (6, 7).

4. Apparatus according to claim 3, wherein the tongues (23) act between a first piece (24) fixed to the piston (4) and a second piece (25) fixed to one of the flanges (6, 7).

5. Apparatus according to claim 4, wherein the first piece is in a single piece with the piston (9) and consists of one of a lug and a transverse flange.

6. Apparatus according to claim 4, wherein the first piece (24) is fixed to said piston by one of welding, adhesive bonding or crimping.

7. Apparatus according to claim 6, wherein, for fixing the first piece (24), the piston (4) has at its external periphery an axially oriented annular skirt (27) extending away from the transverse wall (3).

8. Apparatus according to claim 7, wherein the first piece (24) is flat and has at its external periphery lugs (44) each engaged in a notch (46) provided in the free end of the skirt (27).

9. Apparatus according to claim 8, wherein the second piece (25) is distinct from the annular flange (6, 7) and has transverse lugs (53) provided in the free end of the relevant flange (6, 7).

10. Apparatus according to claim 9, wherein the lugs (53, 44) on the second (25) and first (24) pieces are fixed respectively to the flange (6, 7) and to the skirt (27) of the piston.

11. Apparatus according to claim 9, wherein the fixing is effected by crimping, the lateral edges of the notches (45, 46) being crushed.

12. Apparatus according to claim 11, wherein the second piece has the shape of an angle bracket and has a transversely oriented part to which the tongues (23) are fixed and an axially oriented part having the transverse lugs (53) at its external periphery.

13. Apparatus according to claim 1, wherein the tongues (23) are fixed to pieces (25) in the form of stepped tongues each with a bracket for fixing a set of tongues, and wherein the pieces are fixed to the periphery of the transverse wall.

14. Apparatus according to claim 1, wherein the tongues are fixed by riveting.

15. Apparatus according to claim 14, wherein the hub (14) has an axially oriented annular part (16) directed towards the transverse wall and wherein the piston (4) surrounds said axially oriented annular part (16) of the hub (14) with annular clearance.

16. Apparatus according to claim 15, wherein a torsion damper (28) is interposed between the piston (4) and the transverse wall (3) in order to filter the vibrations, said damper acting disengageably between the piston (4) and the hub (14).

17. Apparatus according to claim 16, wherein the torsion damper has two guide washers (36, 37) disposed on each side of a damper plate (35) wherein a disc (31) is fixed to the guide washers (36, 37) and wherein the disc (31) is intended to be clamped between the first and second surface (1, 2).

18. Apparatus according to claim 17, wherein the disc (31) carries on each of its faces a friction lining (33) and wherein the linings (33) are adapted to be clamped between the surfaces (1, 2).

19. Apparatus according to claim 18, wherein the disc (31) is fixed to flanges pressed against each other (55, 155), said flanges being disposed on the guide washers (36, 37) at their respective external periphery.

20. Apparatus according to claim 19, wherein the axially oriented annular part (16) is provided with a surface (20) surrounded by a ferrule (22) which the piston has at its internal periphery and wherein the surface (20) is extended in the direction of the transverse wall by flutes (19) for a rotational connection, taking up of a circumferential clearance, of a hub on the torsion damper (28).

21. Apparatus according to claim 19, wherein a friction means (60) acts between a transverse surface (15) of the hub (14) and the piston (4) and wherein the piston (4) is shaped so as to carry the friction means (60), and wherein the hub (14) has the axially oriented annular portion (16) directed towards the transverse wall (3) and surrounded by the piston (4) mounted so as to be able to move axially with respect to said annular portion.

22. Apparatus according to claim 21, wherein one of the friction means (60) and piston (4), has at least one projection (61, 166, . . . ) engaged in a complementary manner in a hole (62, 66, . . . ) in the other one of the piston (4) and friction means (60).

23. Apparatus according to claim 22, wherein the turbine wheel (12) has an annulus (13) fixed to the hub (14) by means of a rivet (59), wherein the friction means (60) acts between the hub (14) and the piston (4) and wherein the friction means (60) is carried by at least one rivet (59).

* * * * *